United States Patent
Lambertson et al.

(10) Patent No.: US 12,360,073 B2
(45) Date of Patent: Jul. 15, 2025

(54) METHOD FOR DETERMINING AT LEAST ONE MEMBRANE PROPERTY OF AN ANALYTE SENSOR

(71) Applicant: Roche Diabetes Care, Inc., Indianapolis, IN (US)

(72) Inventors: Michael Lambertson, Mannheim (DE); Kirill Sliozberg, Mannheim (DE); Alexander Steck, Mannheim (DE); Frederic Wehowski, Mannheim (DE)

(73) Assignee: Roche Diabetes Care, Inc., Indianapolis, IN (US)

( * ) Notice: Subject to any disclaimer, the term of this patent is extended or adjusted under 35 U.S.C. 154(b) by 321 days.

(21) Appl. No.: 17/930,966

(22) Filed: Sep. 9, 2022

(65) Prior Publication Data

US 2023/0003681 A1 Jan. 5, 2023

Related U.S. Application Data

(63) Continuation of application No. PCT/EP2021/055725, filed on Mar. 8, 2021.

(30) Foreign Application Priority Data

Mar. 10, 2020 (EP) .................................. 20162098

(51) Int. Cl.
*G01N 27/327* (2006.01)
*G01N 27/30* (2006.01)
*G01N 27/40* (2006.01)

(52) U.S. Cl.
CPC ................. *G01N 27/327* (2013.01)

(58) Field of Classification Search
CPC ....... G01N 27/327–3274; G01N 27/30; G01N 27/40; G01N 27/33
See application file for complete search history.

(56) References Cited

U.S. PATENT DOCUMENTS 5,098,547 A * 3/1992 Bryan ................ G01N 33/0006
204/415
5,312,762 A * 5/1994 Guiseppi-Elie ........ C12Q 1/005
435/14

(Continued)

FOREIGN PATENT DOCUMENTS

EP 0241601 A1 * 10/1987 ............. G01N 27/46
TW 201514486 A 4/2015

(Continued)

OTHER PUBLICATIONS

International Search Report and Written Opinion of the International Searching Authority, PCT/EP2021/055725, May 12, 2021, 9 pages.

*Primary Examiner* — Alexander S Noguerola
(74) *Attorney, Agent, or Firm* — Bose McKinney & Evans LLP

(57) ABSTRACT

A method for determining a membrane property of an analyte sensor that has at least two measurement electrodes and at least one of the measurement electrodes has a membrane having the membrane property. The method includes generating a fast-transient voltage signal and applying the fast-transient voltage signal to the measurement electrodes. A response signal is measured, and the membrane property is determined by evaluating the response signal.

17 Claims, 6 Drawing Sheets

(56) References Cited

U.S. PATENT DOCUMENTS

| | | | |
|---|---|---|---|
| 2002/0027085 A1* | 3/2002 | Stori | G01N 27/286 |
| | | | 205/775 |
| 2010/0213079 A1 | 8/2010 | Willis | |
| 2012/0262298 A1 | 10/2012 | Bohm et al. | |
| 2014/0005508 A1* | 1/2014 | Estes | A61B 5/14865 |
| | | | 600/347 |
| 2016/0177365 A1 | 6/2016 | Katsuki | |
| 2019/0282142 A1 | 9/2019 | Fink et al. | |
| 2020/0209179 A1* | 7/2020 | Bohm | A61B 5/1468 |

FOREIGN PATENT DOCUMENTS

| | | |
|---|---|---|
| TW | 201606303 A | 2/2016 |
| WO | WO 2019/007842 A1 | 1/2019 |
| WO | WO 2019/115687 A1 | 6/2019 |

* cited by examiner

METHOD FOR DETERMINING AT LEAST ONE MEMBRANE PROPERTY OF AN ANALYTE SENSOR

RELATED APPLICATIONS

This application is a continuation of PCT/EP2021/055725, filed Mar. 8, 2021, which claims priority to EP 20 162 098.6, filed Mar. 10, 2020, both of which are hereby incorporated herein by reference.

BACKGROUND

This disclosure teaches a method for determining at least one membrane property of an analyte sensor, a method for determining a concentration of at least one analyte in body fluid using at least one analyte sensor and an analytical system. The analyte sensor may be or may comprise an electrochemical sensor configured for insertion into a body tissue of a user, specifically an insertable or implantable electrochemical sensor for monitoring of the at least one analyte in the body tissue and/or in a body fluid within the body tissue. The method and devices according to this disclosure may be used for detecting at least one analyte present in one or both of a body tissue or a body fluid, in particular the method and devices are applied in the field of detecting one or more analytes such as glucose, lactate, triglycerides, cholesterol or other analytes, preferably metabolites, in body fluids such as blood or interstitial fluid or other body fluids, both in the field of professional diagnostics, in the field of hospital point of care, in the field of personal care and in the field of home monitoring. However, other fields of application are feasible.

In the field of medical technology and diagnostics, a large number of devices and methods for detecting at least one analyte in a body fluid are known. The method and devices may be used for detecting at least one analyte present in one or both of a body tissue or a body fluid, in particular one or more analytes such as glucose, lactate, triglycerides, cholesterol or other analytes, preferably metabolites, in body fluids such as blood or interstitial fluid or other body fluids. Without restricting the scope of this disclosure, in the following, mainly reference is made to the determination of glucose by an electrochemical biosensor as an exemplary and preferred analyte.

A typical electrochemical biosensor comprises a biological recognition element, which can be an antibody, a DNA-string, a protein or more specifically an enzyme. These molecules specifically bind to or react with analyte molecules. The biological recognition element, here exemplary an enzyme, is in contact to a transducer, an element, which transforms the change in the biological recognition element in to a measurable signal. Typical electrochemical biosensor uses working electrode as a transducer. In the case of enzymatic electrodes, the charge (electrons) generated by the enzyme must be efficiently and/or quantitatively collected by the transducer. Depending on the used enzyme and the sensor construction, the charge transfer can be direct from the enzyme to the transducer, i.e., the working electrode, or redox mediated by, e.g., natural oxygen, redox-active polymers or other redox active substances. The here exemplary presented electrochemical sensor deploys the enzyme from the class of oxidoreductase, called glucose oxidase (GOx). GOx may use oxygen as an electron acceptor, reducing it to hydrogen peroxide. The latter is diffusing toward working electrode surface, which is polarized at a potential, sufficient for efficient oxidation of the hydrogen peroxide. Thus, the oxygen/hydrogen peroxide acts as redox mediator for electron transfer from the enzyme active center to the surface of the working electrode. Such scheme corresponds to an enzymatic biosensor of the first generation. In the second generation, other redox reagents are envisaged to replace oxygen. Such mediators may be either freely diffusing species, or bound in a polymer matrix or other way. Some examples of the redox active species are ferrocene and phenazine derivatives, quinones, ruthenium or osmium complexes.

In the field of continuous monitoring, typically, subcutaneous implantable electrochemical sensors are used. A typical subcutaneous continuous glucose sensor is based on an enzymatic oxidation of glucose, which is present in the interstitial fluid (ISF). Glucose concentration in the ISF of the skin is relatively high which may lead to the following problems.

1. The oxidation kinetics of the enzyme may be limiting. Typically, enzymes have such characteristic as turnover number (TON), the maximum number of chemical conversions of molecules, e.g., glucose, per second that a single catalytic site will execute for a given enzyme concentration. It may not be possible for the enzyme to oxidize large amount of glucose such that the enzyme may be the limiting factor of the measuring chain and makes a quantitative measurement impossible.
2. The lifetime under load may be limiting. The turnover number may also have a different meaning, the number of moles of substrate, e.g., glucose, that a mole of catalyst, here the enzyme, can convert before becoming, fully or partially, e.g., to one half of the initial activity, inactivated. Thus, under this high utilization the enzymatic electrode may rapidly lose activity.
3. If the amount of enzyme is enough to oxidize a large amount of glucose, other factors may be limiting, such that a quantitative measurement is impossible. For instance, the kinetics of the electron transfer from the enzyme to the transducer may be the limiting factor.
4. If the activity of the enzymatic electrodes may be adjusted such that the high concentration of glucose is efficiently oxidized and the electron transfer to the electrode is efficient, a local depletion of glucose may exist. Glucose may diffuse relatively slowly in the ISF such that the concentration of glucose in the region of the sensor where it is actively consumed, may be lower compared to the ISF such that a correct and quantitative measurement is not possible.
5. An electrochemical continuous glucose sensor may comprise at least two electrodes, wherein onto one of the electrodes, here denoted as working electrode, the glucose detection by means of oxidation chain happens. A second electrode, denoted counter or auxiliary electrode, is used in order to complete the electrochemical process and to provide a counter reaction to compensate the charge flow. At the working electrode oxidizing processes occur and at the counter electrode reductive processes occur, wherein the amount of charge must be identical and the counterreaction may not be limiting. In the case, if the counter/auxiliary electrode is subcutaneous as well and is made of an electrochemically inactive substance, e.g., gold, the substance which is reduced at the counter electrode is typically the in ISF dissolved molecular oxygen. However, the amount of available dissolved oxygen is significantly less than that of glucose such that the counter reaction may be limiting and a quantitative measurement is thus impossible.

A solution for the aforementioned problems may be using a so-called diffusion limiting layer. The layer may be applied to the working electrode as thin polymer film forming a membrane and may be configured for slowing down the diffusion of the glucose to the sensitive surface of the working electrode. Thus, the glucose concentration directly at the sensitive surface of the working electrode is less but proportional to the glucose concentration in the ISF. However, in order to allow for a correct quantitative measurement of the glucose concentration permeability of the membrane needs to be constant or known. The direct measurement of the membrane permeability in vivo is not possible or very challenging, in particular in case no other nominal values are known from which the permeability can be determined.

Moreover, the permeability of the membrane may depend on several factors such as the material of the membrane, thickness of the membrane, temperature, swelling degree and others. In known methods, impact on temperature may be determined using an external temperature sensor which is placed on the skin. However, as the temperature is determined on the skin but not subcutaneous at a position of the sensor, reliability and accuracy of these methods may be limited.

Several electrochemical methods are known for compensating membrane effects such as using electrochemical impedance spectroscopy or potential pulse techniques. However, these methods may require complex electronics. Moreover, conducting of these additional measurements may result in driving the electrochemical system out of its steady-state, thus the correct measurement during this time and, maybe, some time after, is not possible. In addition, applying of the additional modulation potential may provoke side effects, such as unspecific oxidation of interference substances which may lead to a non-correct measurement values.

Furthermore, these methods are not always sufficiently specific towards membrane effects, and may be influenced by other parameters of the system, such as actual analyte concentration and thus actual signal level, e.g., DC current.

U.S. Publication No. 2010/0213079 A1 describes a system for the measurement of analyte concentration which includes an electrochemical cell having a working electrode coated with a protein layer and a diffusion limiting barrier covering the protein layer, and a counter electrode; a voltage source which provides a voltage between the working electrode and the counter electrode when electrically connected by a conductive medium; and a computing system which measures the dynamic voltage output to the counter electrode within a time period prior to a response from the working electrode and method for use is disclosed.

WO 2019/115687 A1 describes a method for determining an information on an equivalent series resistance in a test strip.

WO 2019/007842 A1 discloses a method for detecting in-vivo properties of a biosensor which is, in interoperation with an electronics unit, adapted for electrochemically determining at least one value of an analyte in a sample of a body fluid. The biosensor comprises at least one working electrode which is covered by a membrane and includes an enzyme for providing a reaction with the analyte. The membrane has an electrical resistance and the working electrode has an electrical capacitance. The electronics unit is adapted for measuring a raw current and a current response indicative of an admittance of the biosensor. The method comprises the steps of: a) providing a sensitivity-to-admittance relation of the biosensor; b) measuring a raw current in the biosensor; c) measuring an in-vivo current response indicative of the in-vivo admittance of the biosensor, wherein the in-vivo current response is measured at at least one first operating point and at at least one second operating point, wherein the first operating point is selected for providing a first characteristic value being related to the electrical resistance of the membrane, and wherein the second operating point is selected for providing a second characteristic value being related to the electrical capacitance of the working electrode; d) determining an analyte value in a sample of a body fluid by using the raw current and compensating an in-vivo sensitivity drift in the biosensor by correcting the measured value for the raw current by determining an actual value of the sensitivity by using the first characteristic value, whereby the sensitivity-to-admittance relation as provided during step a) is taken into account; and e) monitoring a fail safe operation of the biosensor based on the first characteristic value and/or the second characteristic value.

U.S. Publication No. 2012/262298 A1 describes systems and methods for processing sensor data and self-calibration. In some embodiments, systems and methods are provided which are capable of calibrating a continuous analyte sensor based on an initial sensitivity, and then continuously performing self-calibration without using, or with reduced use of, reference measurements.

U.S. Publication No. 2019/282142 A1 describes a sensor device for determining the concentration of an analyte under in-vivo conditions that includes an electrode system having an electrode with immobilized enzyme molecules and a diffusion barrier that controls diffusion from the exterior of the electrode system to the immobilized enzyme molecules. The diffusion barrier may include an aliphatic polyurethane.

SUMMARY

This disclosure teaches a method for determining at least one membrane property of an analyte sensor and a method for determining a concentration of at least one analyte in body fluid using at least one analyte sensor and an analytical system. These teachings at least partially avoid the shortcomings of known devices and methods of this kind and at least partially address the above-mentioned challenges. Specifically, a method for determining permeability of a membrane with reduced complexity and enhanced reliability is taught herein.

As used in the following, the terms "have," "comprise" or "include," or any arbitrary grammatical variations thereof, are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may refer both to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once, typically will be used only once, when introducing the respective feature or element. In the following, in most cases, when referring to the respective feature or element, the expressions "at least one" or "one or more" will not be repeated, non-withstanding the fact that the respective feature or element may be present once or more than once. It shall be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "membrane," "fast-transient voltage signal" and "response signal," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features without any restriction regarding alternative embodiments of the invention, without any restrictions regarding the scope of the invention and without any restriction regarding the possibility of combining the features introduced in such a way with other optional or non-optional features of the invention.

In a first aspect of this disclosure, a method for determining at least one membrane property of an analyte sensor is disclosed.

The term "analyte" as used herein is a broad term and is to be given its ordinary and customary meaning to a person of ordinary skill in the art and is not to be limited to a special or customized meaning. The term specifically may refer, without limitation, to an arbitrary element, component or compound which may be present in a body fluid and the concentration of which may be of interest for a user. Specifically, the analyte may be or may comprise an arbitrary chemical substance or chemical compound which may take part in the metabolism of the user, such as at least one metabolite. As an example, the at least one analyte may be selected from the group consisting of glucose, cholesterol, triglycerides, lactate. Additionally or alternatively, however, other types of analytes may be determined and/or any combination of analytes may be determined.

The term "sensor" as used herein is a broad term and is to be given its ordinary and customary meaning to a person of ordinary skill in the art and is not to be limited to a special or customized meaning. The term specifically may refer, without limitation, to an arbitrary element or device configured for detecting at least one condition or for measuring at least one measurement variable. The term "analyte sensor" as used herein is a broad term and is to be given its ordinary and customary meaning to a person of ordinary skill in the art and is not to be limited to a special or customized meaning. The term specifically may refer, without limitation, to a sensor configured for detecting quantitatively or qualitative at least one analyte. The analyte sensor may be or may comprise at least one electrochemical sensor. The term "electrochemical sensor" specifically may refer to a sensor based on electrochemical measurement principles, such as by using one or more of an amperometric, coulometric or a potentiometric measurement principle. Specifically, the electrochemical sensor may comprise at least one enzyme configured for performing at least one redox reaction in the presence of the analyte to be detected, wherein the redox reaction may be detected by electrical means. As used herein, the term "electrochemical detection" refers to a detection of an electrochemically detectable property of the analyte by electrochemical means, such as an electrochemical detection reaction. Thus, for example, the electrochemical detection reaction may be detected by comparing one or more electrode potentials, such as a potential of a working electrode with the potential of one or more further electrodes such as a counter electrode or a reference electrode. The detection may be analyte specific. The detection may be a qualitative and/or a quantitative detection.

In an embodiment, the sensor may be an optical sensor. The term optical sensor specifically may refer to a sensor based on optical measurement techniques, such as light.

The analyte sensor may be an in-vivo sensor. The term "in-vivo sensor" as used herein is a broad term and is to be given its ordinary and customary meaning to a person of ordinary skill in the art and is not to be limited to a special or customized meaning. The term specifically may refer, without limitation, to a sensor which is configured for being at least partially implanted into a body tissue of a user. The analyte sensor may be a subcutaneous analyte sensor. The analyte sensor may be configured for implantation into a body tissue of the user. More specifically the analyte sensor may be configured for continuous monitoring of the analyte. The analyte sensor may be fully implantable or partially implantable. The term "user" as used herein is a broad term and is to be given its ordinary and customary meaning to a person of ordinary skill in the art and is not to be limited to a special or customized meaning. The term specifically may refer, without limitation, to a human being or an animal, independent from the fact that the human being or animal, respectively, may be in a healthy condition or may suffer from one or more diseases. As an example, the user may be a human being or an animal suffering from diabetes. However, additionally or alternatively, this disclosure may be applied to other types of users.

The analyte sensor comprises at least two measurement electrodes. The term "measurement electrode" as used herein is a broad term and is to be given its ordinary and customary meaning to a person of ordinary skill in the art and is not to be limited to a special or customized meaning. The term specifically may refer, without limitation, to an electrode which is or can be brought in contact with an electrolyte, in particular with a body fluid. The at least two measurement electrodes may be designed such that an electrochemical reaction may take place at one or more of the electrodes. Thus, the measurement electrodes may be embodied such that an oxidation reaction and/or reduction reaction may take place at one or more of the electrodes.

One of the measurement electrodes may be designed as working electrode. The term "working electrode" as used herein is a broad term and is to be given its ordinary and customary meaning to a person of ordinary skill in the art and is not to be limited to a special or customized meaning. The term specifically may refer, without limitation, to an electrode of the analyte sensor which is configured for measuring a signal, such as a voltage, a current, a charge or electrical/electrochemical potential, dependent on the degree of an electrochemical detection reaction taking place at the working electrode, for the purpose of detecting the at least one analyte. The working electrode may comprise at least one test chemical. The working electrode may fully or partially be covered with at least one test chemical, specifically at least one test chemical comprising at least one enzyme for detecting the at least one analyte. As an example, glucose oxidase (GOx) or glucose dehydrogenase (GDH) may be used. The test chemical, further, may comprise additional materials, such as binder materials, electrode particles, mediators or the like. Thus, as an example, the test chemical may comprise at least one enzyme, carbon particles, a polymer binder and $MnO_2$ particles. In another preferred embodiment, the test chemical may comprise a mediator polymer comprising a polymeric material and a metal containing complex, for example a modified poly (vinylpyridine) backbone loaded with poly(bi-imidizyl) Os complexes covalently coupled through a bidentate linkage. Further, the at least one test chemical may be comprised in a single layer, or the test chemical may comprise a plurality of layers, such as one layer having the at least one enzyme and one or more additional layers having one or more additional functions, such as one or more diffusion barriers and/or one or more biocompatibility layers.

The other one of the measurement electrodes may be designed as counter or auxiliary electrode. The term "counter electrode" as used herein is a broad term and is to be given its ordinary and customary meaning to a person of ordinary skill in the art and is not to be limited to a special or customized meaning. The term specifically may refer, without limitation, to an electrode adapted for performing at least one electrochemical counter reaction and/or configured for balancing a current flow due to the detection reaction at the working electrode. The counter electrode may be a part of the implanted or partially implanted analyte sensor, or may be an individual electrode, which is either implanted or partially implanted or placed somewhere else on the body, e.g., on the skin surface. In case of the analyte sensor comprises a two-electrode system as measurement electrodes, the counter electrode may complete the circuit such that charge can flow through an electrochemical cell, also denoted electrochemical system, given by the working electrode, the counter electrode and an electrolyte, such as the body fluid, and may maintain a constant counter electrode potential, also referred to as a constant reference potential, regardless of current.

Additionally, the analyte sensor may comprise at least one reference electrode. The term "reference electrode," also referred to as "pseudo reference electrode," specifically may refer, without limitation, to an electrode of the analyte sensor which is configured to provide an electrochemical reference potential which, at least widely, is independent of the presence or absence or concentration of the analyte. The reference electrode may be configured for being a reference for measuring and/or controlling a potential of the working electrode. The reference electrode may have a stable and well-known electrode potential. The electrode potential of the reference electrode may preferably be highly stable. One of the electrodes may have several functionalities, as for instance, combined reference and counter electrode, which has both, the function of the reference and counter electrodes, which means it provides a reference potential and balances the current flow from the working electrode.

At least one of the measurement electrodes comprises at least one membrane element having the at least one membrane property. Specifically, the membrane element may be applied to the working electrode. The term "membrane element" as used herein is a broad term and is to be given its ordinary and customary meaning to a person of ordinary skill in the art and is not to be limited to a special or customized meaning. The term specifically may refer, without limitation, to at least one element configured for controlling and/or limiting diffusion of the analyte to the electrode to which the membrane element is applied. Thus, the membrane element may be configured as diffusion limiting membrane. However, the membrane element may have even more functionalities, such as providing biocompatibility. The membrane element may have further functions such as blocking of leakage of components below the membrane element such as of the enzyme or other components comprised in any one of the at least two measurement electrodes. The membrane element may also be configured as a blocking membrane. As used herein, the term "blocking" may refer to preventing leakage of inner components of a sensitive layer of the working electrode but not to the analyte. The membrane element may be configured for maintaining of sensor integrity, by for instance keeping the enzyme or redox mediator from leaching, thus gradation of the whole sensor. Independently on the role of the membrane element, its altering may be compensated.

The membrane element may comprise at least one polymer. The membrane element may be applied to the working electrode as thin polymer film. For example, the membrane element may be or may comprise Poly-(4-(N-(3-sulfonatopropyl)pyridinium)-co-(4vinyl-pyridine)-co-styrene (5%/90%/5%) or hydrophilic Polyurethane (HP60D20) available from Lubrizol®. For example, the membrane element may comprise at least one of the following polymer classes and/or their copolymer: Poly(4 vinyl pyridine), Polymethacrylate, Polyacrylate, Polyvinyl pyrrolidone, Polyvinyl alcohol (PVA), Polyethylene glycol.

The term "membrane property" as used herein is a broad term and is to be given its ordinary and customary meaning to a person of ordinary skill in the art and is not to be limited to a special or customized meaning. The term specifically may refer, without limitation, to an arbitrary physical property of the membrane element influencing the determining of the analyte. Specifically, the membrane property may be a permeability of the membrane element. The term "permeability" as used herein is a broad term and is to be given its ordinary and customary meaning to a person of ordinary skill in the art and is not to be limited to a special or customized meaning. The term specifically may refer, without limitation, to a material parameter characterizing transmission properties of the membrane element, specifically passing of substances through the membrane element. Further specifically, permeability may refer to permeability for a specific analyte since molecules and ions of the analytes may have different sizes, shapes and charge. In an embodiment, the permeability refers to the permeability of the membrane for glucose.

Permeability of the membrane element for certain compounds may be proportional to the membrane's swelling degree. The swelling degree may correspond to the degree of water uptake. The swelling degree of the membrane may depend on its hydrophilicity. The membrane's swelling degree may directly affect the amount and/or mobility and, thus, the permeability of the membrane for certain compounds. The conductivity of an electrolyte like water or bodily fluid, such as interstitial fluid is directly linked to so-called total dissolved solids whereby ions, such as H+, OH—, Na+, K+, Cl— and other have the most contribution. Therefore, also the conductivity of the membrane which has taken up water or bodily fluid such as interstitial fluid is directly linked to the total dissolved solids. The more charge carriers are present and the more mobile they are, the lower is the measured electrical resistance, by otherwise constant conditions, such as, e.g., cell geometry. Thus, the electrical resistance, or reversely, electric conductivity of the membrane element may depend on quantity and mobility of ions present in the membrane.

The proposed method may comprise using at least one algorithm configured for determining permeability of the membrane element for a specific analyte, in particular glucose, by evaluating electrical resistance of the membrane element. The permeability of the membrane element for a specific analyte $p_{Analyt}$ may be determined by $p_{Analyt}=f*p$, wherein p is the permeability determined via the electrical resistance of the membrane element and f is a conversion factor. The conversion factor may be determined in calibration experiments using known glucose values. The membrane property, in particular the permeability, may depend on different parameters such as temperature, composition of interstitial fluid, thickness of the membrane element, aging, swelling degree, mechanical stresses and the like.

After insertion of the analyte sensor, the membrane element may swell. In ideal case, the swelling process may be rapid such that a determining of the concentration of the analyte is not influenced, or a swelling behavior may be pre-known such that changes in permeability can be considered and corrected. However, in non-ideal case, the swelling of the membrane element may lead to unknown changes in permeability.

Composition of the interstitial fluid may vary from user to user. Components of the interstitial fluid may change permeability of the membrane element such that molecules and ions can ingress from the interstitial fluid into the membrane element. The molecules and ions can bind to certain functional groups of the polymer of the membrane element and can change permeability of the membrane element. Effects due to non-constant interstitial fluid can be temporal, i.e., binding of ingressed molecules and ions to functional groups of the polymer of the membrane element may be reversible. However, even in non-permanent changes diffusion of ingressed molecules and ions out of the membrane may last some time.

Permeability of the membrane element may depend on temperature, as it directly influences the ions mobility within the membrane. The temperature at insertion site of the analyte sensor may not be constant such that in-operando monitoring of permeability may be performed. Intrinsic properties of the membrane element may change during storage of the analyte sensor. These changes may depend on storage conditions. For example, the membrane property may change faster at high temperatures. Such changes may lead to changes in permeability and may lead to non-reliable measurements.

Further, mechanical load may change permeability of the membrane. For example, if a user lays down to bed on a side where the inserted analyte sensor is arranged, skin of the user and the analyte sensor may be mechanically compressed which may result in decrease of the sensor signal.

The partially or fully implanted analyte sensor may comprise at least one biocompatibility layer such as a thin layer of highly hydrophilic polymer. This layer may be applied independently on the presence of the diffusion limiting membrane and may influence the diffusion of the analyte, thus acting as kind of diffusion limiting membrane. For accurate measurements, this effect may be considered and the method according to this disclosure may be applied for compensation of biocompatible layers or other layers, which are not deliberately diffusion limiting layers.

The determining of the membrane property may comprise testing the membrane property. The method may further comprise at least one calibration step, wherein effects of the different parameters on the permeability of the membrane element may be determined. For each of the parameters influencing permeability of the membrane element at least one correction factor may be determined by calibration experiments. The method may comprise determining correction factors for interdependent parameters. The method may comprise determining permeability of the membrane element considering the at least one correction factor. The method may comprise in-operando monitoring of permeability, in particular continuously or in short time intervals. Also temperature monitoring is possible. As will be outlined in detail below, the method may comprise at least one failsafe step in order to enhance reliability of the determining of the analyte concentration.

The method comprises the method steps as given in the corresponding independent claim and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

The method comprises the following steps:
a) generating at least one fast-transient voltage signal and applying the fast-transient voltage signal to the measurement electrodes;
b) measuring a response signal;
c) determining the at least one membrane property by evaluating of the response signal.

The method according to this disclosure may propose recording of the response signal directly after an excitation pulse and after some time, such as after 10 µs. The difference of these two values may deliver a value, which, after applying some algorithm, may result in better compensation of the membrane effects.

Specifically, the method comprises the following steps:
generating the at least one fast-transient voltage $U_{gen,pulse}$ and applying it to a membrane comprising circuit serially connected with a reference resistor $R_{ref}$, wherein the membrane element has a resistance $R_{mem}$;
recording a voltage $U_{meas,pulse}$ either at the reference resistor $R_{ref}$ or at the membrane element comprising circuit $R_{mem}$;
determining the at least one membrane property by calculating the $R_{mem}$ from $U_{gen,pulse}$, $U_{meas,pulse}$ and $R_{ref}$.

For example, a simplified circuit may comprise a sensor, represented as a simple Randle's circuit, the reference resistor $R_{ref}$, a measurement resistor $R_{meas}$, a shunt capacitor $C_{shunt}$, a signal generator device, in particular a voltage source, and a voltmeter (V). The Randle's circuit may comprise the charge transfer resistance $R_{ct}$, which represents the diffusion limited analyte current, double layer capacitance $C_{dl}$ at the electrode surface and the membrane element resistance $R_{mem}$. The signal generator device may be configured for applying a DC base voltage $U_{gen,base}$ and fast-transient voltage $U_{gen,pulse}$. During the DC base voltage is applied, the current flows through all four resistors in the circuit. There is no current flow through the capacitors, as they are charged to the corresponding level. The $R_{ct}$ may be a few orders of magnitude larger, than $R_{mem}$, such that the voltage drop at the $R_{mem}$ can be neglected in the first approximation. The same may be valid for the $R_{ref}$ which is chosen to be roughly the same value as the $R_{mem}$. The value for $R_{meas}$ may be chosen at the way, to get substantial voltage drop at it, which is then measured, e.g. using an additional voltmeter or electrometer and converted in the response signal, also denoted sensor current signal. Thus, the value of the $R_{meas}$ may be roughly of the same order of magnitude as the $R_{cr}$. Since the voltage drop at the $R_{meas}$ is substantial, it may be compensated by the voltage source, which is in a feedback with the current measuring unit based on the $R_{meas}$. The calculation of the $R_{mem}$ may be done as $$R_{mem} = R_{ref} \frac{U_{meas,pulse}}{U_{gen,pulse} - U_{meas,pulse}}$$

The term "fast-transient voltage" as used herein is a broad term and is to be given its ordinary and customary meaning to a person of ordinary skill in the art and is not to be limited to a special or customized meaning. The term specifically may refer, without limitation, to at least one arbitrary voltage change in between two electrodes. The arbitrary voltage change may have fast transient signal flanks, in particular two very steep edges The fast-transient voltage may comprise a square wave form and/or a sine wave form. The fast-transient voltage may comprise a non-continuous signal such as a pulse. Specifically, the fast-transient voltage may comprise a fast transition square wave.

The term "pulse" as used herein is a broad term and is to be given its ordinary and customary meaning to a person of ordinary skill in the art and is not to be limited to a special or customized meaning. The term specifically may refer, without limitation, to a signal having a transient change in the amplitude of the signal from a first value, also denoted baseline value, to a second value, followed by a return to the baseline value or at least approximately to the baseline value. The second value may be a higher or lower value than the baseline value. A pulse duration may be $\leq 50$ µs, preferably $\leq 20$ µs, more preferably $\leq 10$ µs. The duration of the single pulse must be sufficiently long to be able to record its propagation. The duration of the single pulse must be preferentially short, in order to not excite the system electrochemically. The fast-transient voltage signal may be applied during at least one test sequence, for example a time sequence. The fast-transient voltage signal may be applied repeatedly, in particular periodically. The time distance between the cycles must be sufficiently long in order to keep the system at its steady-state. The fast-transient voltage signal may comprise a repeatable cycle, wherein the repeatable cycle comprises at least one signal flank. The pulse may comprise two edges: the leading edge or front edge, which is the first edge of the pulse and the trailing edge or back edge, which is the second edge of the pulse. The response signal may be measured at several time points $t_i$ with $i>1$ after application of the fast-transient voltage signal. The time points $t_i$ may be set to be before a time at which the system electrochemically excites. In particular, electrical capacitance of the working electrode and the electrical resistance of the membrane element are known to be related to each other by time constant $\tau$. The time points $t_i$ may be below $\tau$ because the pulse of the fast-transient voltage signal has a very short constant time that is well below $\tau$.

The terms first and second "value" may refer to regions or points of the fast-transient voltage, in particular its amplitude. The first value may be the baseline value. The first value may be a local and/or overall minimum of the fast-transient voltage signal. The first value may be a first plateau of the fast-transient voltage signal. The first value may refer to a time point with no voltage is applied to the measurement electrodes. The first value may be the DC polarization voltage of the sensor. The second value may be a local and/or overall extremum of the fast-transient voltage signal. The second value may be a second plateau of the fast-transient voltage signal, which may be reached during application of the fast-transient voltage. The second value may be extremum of the fast-transient voltage signal.

The term "signal flank" as used herein is a broad term and is to be given its ordinary and customary meaning to a person of ordinary skill in the art and is not to be limited to a special or customized meaning. The term specifically may refer, without limitation, to transition of a signal amplitude from low to high signal value or from high to low signal value. The signal flank may be a rising signal flank or a falling signal flank. The signal flank of the fast-transient voltage signal may have a change in signal from the first value of the signal flank to the second value of the signal flank in a microsecond to nanosecond range. The signal flank of the fast-transient voltage signal may have a change in signal from the second value of the signal flank to the first value of the signal flank in a microsecond to nanosecond range. The signal flank may also be referred to as edge.

The fast-transient voltage may have a low-to-high transition of a signal amplitude, which is equivalent to rising or positive signal flank, or high-to-low transition of a signal amplitude, which is equivalent to falling or negative signal flank. The fast-transient voltage may have steep edges. The signal flank, in particular edge, of the fast-transient voltage may have a change from the first value to the second value in a microsecond to nanosecond range. The signal flank of the fast-transient voltage may have a change from the second value to the first value in a microsecond to nanosecond range. Specifically, the fast transition square wave may have a change in voltage from the first value to the second value below or equal 50 ns, preferably below or equal 20 ns. The change in voltage from the first value to the second value may be even faster and may be only limited by electronics such as by a fast-transient voltage generator (DAC, DO or others) or a read-out unit (voltage amplifier, ADC, or others). The faster the change of voltage (higher slew rate) and the sharper the transition to the plateau, the more precise the membrane property can be determined.

The term "fast-transient" as used herein is a broad term and is to be given its ordinary and customary meaning to a person of ordinary skill in the art and is not to be limited to a special or customized meaning. The term specifically may refer, without limitation, to a time range between first and second values of the signal flank. The fast-transient voltage signal may have a rising signal flank and a falling signal flank. The fast-transient voltage signal may have steep edges. Specifically, the fast transition square wave may have a change in signal from the first value of the signal flank to the second value of the signal flank below or equal 50 ns, preferably below or equal 20 ns. The change in signal from the first value of the signal flank to the second value of the signal flank may be even faster and may be only limited by electronics such as by an analog-to-digital-converter. The faster the flank and the sharper the transition to the plateau, the more resolution may be between the ohmic part of the system resistance and the capacitive part of the system capacitance.

The duration of the single fast-transient voltage must be sufficiently long to record the response voltage. The duration of the single fast-transient voltage must be sufficiently short, in order to avoid the system perturbation as explained above.

Without wishing to being bound by theory, the fast-transient voltage or the voltage pulse is so short, in particular ultrashort, that no faradaic currents are generated and that an electrochemical system of the analyte sensor is not disturbed and brought out of equilibrium. The ultrashort voltage of the fast-transient voltage for determining the membrane property may allow that a measurement signal for determining the analyte concentration can be undisturbed determined. The ultrashort voltage signal may prevent that side reaction occur. Moreover, the method according to this disclosure may allow to stay in the so-called time domain such that there is no need to transform to the so-called frequency domain.

An amplitude of the fast-transient voltage may vary in a broad range and must be optimized for a given set-up. Generally, the lower limit may be limited by the readout technique, which must record the response voltage, mostly by its input range and resolution and may require an additional sufficiently fast voltage amplifier.

The fast-transient voltage may comprise a repeatable cycle, wherein the repeatable cycle comprises at least one signal edge. The fast-transient voltage may be applied during at least one test sequence, for example a time sequence. The fast-transient voltage signal may be applied repeatedly, in particular periodically. The interval between the cycles may be sufficiently long in order to let the double layer capacitance and the shunt capacitor to recharge to their previous steady-state voltage. The discharge of these capacitances after stop of the fast-transient voltage applying, as described above, means current flow opposite to the analyte current and thus distortion of the signal. Thus, the data acquisition for the recharging time may be stopped or the corresponding acquired samples may be ignored.

The fast-transient voltage may be applied repeatedly to the measurement electrodes, in particular in time intervals from minutes to seconds. For example, the fast-transient voltage signal may be applied repeatedly in 5 minutes-intervals.

The fast-transient voltage signal may be generated by at least one signal generator device. The term "signal generator device" generally refers to a device, for example a voltage source, being configured to generate a voltage signal. The "signal generator device" may also be referred to as "voltage generating device." The signal generator device may comprise at least one voltage source. The signal generator device may comprise at least one function generator selected from the group consisting of: at least one square wave generator and at least one sine wave generator. The signal generator device may also generate a single pulse which may be unsymmetrical. "Unsymmetrical" in this context means that a first pulse may be different from a second pulse and/or a third pulse and/or any other subsequent pulse. The signal generator device may be part of measurement electronics of the analyte sensor and/or may be connected to the analyte sensor and may be designed as a separate device. The signal generator device may be configured for applying the fast-transient voltage signal to the measurement electrodes. The fast-transient voltage signal may be applied to at least two measurement electrodes in at least one signal application step.

The term "applying the fast-transient voltage signal to the measurement electrodes" as used herein is a broad term and is to be given its ordinary and customary meaning to a person of ordinary skill in the art and is not to be limited to a special or customized meaning. The term specifically may refer, without limitation, to applying the fast-transient voltage signal to one of the measurement electrodes, in particular to the working electrode. In particular, in case of a two or three electrode sensor, the fast-transient voltage signal may be applied between the working electrode and the counter electrode.

The term "response signal" as used herein is a broad term and is to be given its ordinary and customary meaning to a person of ordinary skill in the art and is not to be limited to a special or customized meaning. The term specifically may refer, without limitation, to measured propagation of the applied fast-transient voltage signal. The terms "response signal" and "propagation" are used herein as synonyms. The response signal may be a change of the applied fast-transient voltage signal. The response signal may directly or indirectly refer to equivalent series resistance of the analyte sensor. The response signal may be the ohmic and capacitive characterization of the analyte sensor in its in-vivo surroundings. In particular, the response signal does not relate to current response. The response voltage may be determined either at the reference resistor or at the membrane element.

As outlined above, the response signal does not relate to current response but to a voltage response. Thus, in contrast to known methods, such as described in WO 2019/007842, this disclosure proposes measuring a voltage response and not measuring a current response indicative of an admittance of the biosensor. This fact may have direct consequences for application of the fast-transient voltage signal when a two or a three electrode sensor is used, namely according to this disclosure the fast-transient voltage signal is applied between the working electrode and the counter electrode, and not between the working and the reference electrode. Moreover, this disclosure may not comprise any peak detection such that charge counters or peak detector are not required.

The analyte sensor may comprise and/or may be connected to at least one measuring device and/or may be part of at least one measuring device, in particular at least one potentiostat or galvanostat, configured for determining the concentration of the analyte. Operating principles of potentiostats and galvanostats are generally known to the person skilled in the art.

The potentiostat may be configured for generating and/or applying of at least one measurement voltage signal, in particular a polarizing potential or voltage. As used herein, the term "measurement voltage signal" may refer to a voltage signal used for determining the concentration of the analyte. The measurement voltage signal may be different to the fast-transient voltage signal. In particular, the measurement voltage signal may be longer compared to the fast-transient voltage signal. The measurement voltage signal may be a permanent signal, not a pulsed one. The measurement voltage signal may be adjusted from time to time or continuously in order to give the analyte sensor its polarization voltage, preferably, in order to keep the predefined polarization voltage at the analyte sensor. The measurement voltage signal may be a continuous direct current (DC) signal which polarizes the electrochemical cell, and serves as the "motor" for the amperometric measurement of the analyte reducing or oxidizing GO.x across the electrochemical cell. The fast-transient voltage signal may be a voltage pulse with high frequency that only characterizes the capacitive and ohmic parts of the electrochemical cell. Therefore, the measurement voltage signal and the fast-transient voltage signal may not influence each other, since they have completely different time domains.

In a two-electrode system, the measurement voltage signal and the fast-transient voltage may be applied to the same or electrodes. In a three-electrode system a working potential is determined and controlled between the working electrode and the reference electrode. In order to achieve this, the potentiostat may regulate the voltage between reference electrode and counter electrode. Thus, the potential of the working electrode may be determined vs. the reference electrode, but the potential of the working electrode may be regulated via the working-electrode-counter-electrode-voltage. The fast-transient voltage signal can be applied between the counter electrode and the working electrode.

In particular, the potentiostat may be configured for monitoring and maintaining a potential applied at the working electrode. The potentiostat may be configured for monitoring and maintaining the potential between the reference electrode and the working electrode. The potentiostat may be configured for monitoring and maintaining the potential between the combined counter-reference electrode and the working electrode. The potentiostat may be configured for maintaining the desired polarization voltage, for example 50 mV, between the reference electrode and the working electrode or between the working electrode and the combined counter-reference electrode. The current flowing between working and counter or combined counter-reference electrode may be measured at the working or counter or combined counter-reference electrode. The reference electrode may be used to monitor the potential of the working electrode.

The reference resistance may be selected suitable for determining a value to be measured such as the electrical resistance of the membrane element. The reference resistance may be an average value determined, specifically pre-determined, from a plurality of reference measurements. The reference resistance must reflect the measurement range of the membrane element. This reference resistance may reflect required measurement tolerances which must be maintained for correct membrane element resistances.

The fast-transient voltage amplitude may be determined by using the reference resistor. Before the application of the fast-transient voltage the potentiostat determines the measurement voltage only. During the application of the fast transient voltage signal the potentiostat determines the sum of the measurement voltage signal and the fast-transient voltage signal. The potentiostat may be configured for determining the propagation of the fast-transient voltage signal applied to the working electrode. The potentiostat may be configured for determining a change or difference $\Delta V_{ex}$ of the measurement voltage signal at the working electrode before application of the fast-transient voltage signal and during the application of the fast-transient voltage signal. The potentiostat may be configured for determining a change or difference $\Delta V_{prop}$ of voltage at the reference resistor before application of the fast-transient voltage signal and during the application of the fast-transient voltage signal.

An equivalent circuit of the electrochemical system of the analyte sensor, may comprise for each of the working electrode and the counter electrode a double layer capacitance in parallel with a charge transfer resistance, as outlined above. The resistance of the electrolyte between the working electrode and the reference electrode may be given by an electric resistance R2 and the resistance of the electrolyte between the counter electrode and the reference electrode may be given by an electric resistance R1. The resistance R2 may further be dependent on properties of the membrane element.

For measuring the response signal the analyte sensor may comprise additional components, in particular, in addition to the components of the potentiostat as described above. For ex-ample, the may comprise additional capacitors and/or additional resistors. Specifically, the fast-transient voltage signal may be applied to one of the measurement electrodes, in particular the working electrode, in series with the reference resistance, denoted $R_3$ or $R_{ref}$. $R_{ref}$ may be a known reference resistance such as a predetermined reference resistance. The reference resistance may be an average value determined, specifically pre-determined, from a plurality of reference measurements. The reference resistance must reflect the measurement range of the cell. This reference resistance may reflect required measurement tolerances which must be maintained for correct system resistances. The reference resistance may be selected suitable for determining a value to be measured such as the electrical resistance of the membrane element. The fast-transient voltage signal may be determined by using the reference resistor. Before the application of the fast-transient voltage signal the potentiostat determines the measurement voltage signal only. After the application of the fast-transient voltage signal the potentiostat determines the sum of the measurement voltage signal and the fast-transient voltage signal.

The evaluating of the response signal may comprise determining equivalent series resistance of the electrochemical system and determining the at least one membrane property from the equivalent series resistance of the electrochemical system. In order to measure the membrane property, in particular equivalent series resistance of the electrochemical system, the fast-transient voltage signal may be sent to the working electrode. The edges of the fast-transient voltage signal are very steep such that the additional capacitors and equivalent capacitors of the electrochemical system of the analyte sensor act like short-circuits. The equivalent series resistance of the electrochemical system may be determined by $$R_1 + R_2 = R_3 \frac{\Delta V_{prop}}{\Delta V_{ex} - \Delta V_{prop}} = R_3 \frac{V_{prop,during\,Pulse} - V_{prop,before\,Pulse}}{(V_{ex,during\,Pulse} - V_{ex,before\,Pulse}) - (V_{prop,during\,Pulse} - V_{prop,before\,Pulse})},$$

wherein $V_{prop,beforePulse}$ refers to the voltage at the working electrode before applying the fast-transient voltage signal, $V_{ex,beforePulse}$ measurement voltage signal at the reference resistor before applying the fast-transient voltage signal, $V_{prop,duringPulse}$ refers to the voltage at the working electrode during applying the fast-transient voltage signal, $V_{ex,duringPulse}$ refers to the voltage signal at the reference resistor during applying the fast-transient voltage signal. Before the application of the fast-transient voltage signal $V_{ex,beforePulse}$ may correspond to a voltage at the reference resistor in response to the measurement voltage signal. After the application of the fast-transient voltage signal $V_{ex,duringPulse}$ may correspond to the voltage at the reference resistor in response to the measurement voltage signal and due to the propagation of the fast-transient voltage signal. The method further may comprise at least one subtracting step, wherein from the determined equivalent series resistance a predetermined or known value of the electrolyte resistance $R_1 + R_2$ of the electrolyte is subtracted.

The technical realization of the measurement setup may be simple and requires only a minimum number of additional components in addition to the known potentiostat. The determined response signal may not require further processing and may be directly digitalized. The measured response signal may provide absolute values and not relative changes. The determined electrical resistance may be very selective to the membrane property. In particular, the measured electrical resistance may not comprise resistance relating to charge transfer processes of the electrochemical system. Thus, it may be possible to exclude the influences, e.g., of the test chemistry, to the response signal.

As outlined above, the analyte sensor may be an in vivo sensor, specifically an in vivo continuous glucose sensor. The method may be an in-process control. The method may be performed during in-vivo measurement. The method may be performed in-operando. Specifically, the method may be performed during determining of the concentration of the analyte. Additionally or alternatively, the method may be performed during manufacturing of the analyte sensor. For example, the manufacturing process may comprise at least one calibration, wherein the analyte sensor may be operated with a sample of known analyte concentration. The method may be used for providing a factory calibrated analyte sensor. Not each sensor of the given batch may be calibrated, but some of the analyte sensors.

The method may comprise at least one failsafe step. As used herein, the term "failsafe step" refers to at least one step ensuring to prevent generating and/or determining and/or displaying unreliable or false measurement values. The failsafe step may be triggered depending on the determined membrane property. The failsafe step may comprise generating at least one information about a condition of the membrane element. The term "condition of the membrane element" as used herein is a broad term and is to be given its ordinary and customary meaning to a person of ordinary skill in the art and is not to be limited to a special or customized meaning. The term specifically may refer, without limitation, to information about suitability of the membrane element to be used in the analyte sensor for determining the concentration of the analyte. For example, the information about the condition may comprise information about aging and/or mechanical stability. The condition of the membrane element may comprise information about manufacturing tolerances of the membrane thicknesses through dispensing, screen printing or other which lead to these differences in diffusion. The method according to this disclosure may allow to identify differences in lot runs from material suppliers, or changes when a supplier changes something in the makeup of the membrane material. The failsafe step may further comprise detecting excessive moisture across counter electrode and working electrode. The failsafe step may comprise comparing the determined membrane property with at least one pre-determined or pre-defined reference value. The failsafe step may comprise storing, e.g., within a measurement engine electronic, for example, of the evaluation device, the pre-determined and/or pre-defined reference value, in particular a resistance limit. For example, the determined membrane property deviates from the pre-determined or pre-defined reference value. For example, an expected membrane element resistance may be 2 k$\Omega$. If the determined membrane element resistance is very different from what is expected, the analyte sensor may be considered as failed sensor. Having something very different over long time may indicate a failed sensor. Having the determined membrane element resistance value close or equal zero may indicate shortcut, having the determined membrane element resistance out of range may indicate circuit brake. For example, in case the determined membrane property deviates from the pre-determined or pre-defined reference value, the determining of the concentration of the analyte may be stopped and/or determined concentration values may be rejected and/or the analyte sensor may be rejected for use or further use. The failsafe step may be performed before and/or during determination of the at least one analyte in body fluid. The failsafe step may be performed repeatedly, for example in a pre-defined interval, such as every minute or every 5 minutes.

However, other embodiments and time intervals are possible. Based on the comparison, in the failsafe step, at least one failsafe decision may be determined and/or at least one failsafe action may be performed. For example, the failsafe step may comprise issuing and/or displaying an error message in case the information on the electrical resistance of the membrane element exceeds the resistance limit. For example, the failsafe step may comprise preventing issuing and/or displaying the analytical result in case the electrical resistance of the membrane element exceeds the resistance limit. The failsafe step may comprise issuing and/or displaying an error message in case the electrical resistance of the membrane element exceeds the resistance limit. The fail safe step may comprise displaying a warning message in case the electrical resistance of the membrane element exceeds the resistance limit. The failsafe step may comprise request to remove the analyte sensor in case the electrical resistance of the membrane element exceeds the resistance limit.

In a further aspect, a method for determining a concentration of at least one analyte in body fluid using at least one analyte sensor is disclosed. The analyte sensor comprises at least two measurement electrodes. At least one of the measurement electrodes comprises at least one membrane element having at least one membrane property. The method comprises determining the at least one membrane property of the analyte sensor according to this disclosure and according to one or more of the embodiments of the method as disclosed above or as disclosed in further detail below. The method comprises at least one analyte measurement step. In the measurement step at least one measurement value of the concentration of the analyte is determined.

The method comprises the method steps as given in the corresponding independent claim and as listed as follows. The method steps may be performed in the given order. However, other orders of the method steps are feasible. Further, one or more of the method steps may be performed in parallel and/or in a time overlapping fashion. Further, one or more of the method steps may be performed repeatedly. Further, additional method steps may be present which are not listed.

For definitions of the features of the method and for optional details of the method for determining the concentration of the analyte, reference may be made to one or more of the embodiments of the method for determining the membrane property as disclosed above or as disclosed in further detail below.

The term "determining a concentration of at least one analyte" generally refers to a quantitative detection of the at least one analyte. As a result of the determination, at least one signal, such as at least one measurement signal, and/or at least one measurement value may be produced and/or provided which characterizes an outcome of the determination. The signal specifically may be or may comprise at least one electronic signal such as at least one voltage and/or at least one current. The at least one signal may be or may comprise at least one analogue signal and/or may be or may comprise at least one digital signal.

As outlined above, the method comprises at least one analyte measurement step. In the analyte measurement step the measurement voltage signal may be applied to the working electrode such that a constant potential may be applied between the working electrode and the reference electrode such that a current produced at the working electrode flows towards the counter electrode. The current may be measured at the counter electrode using I/U converter and an analog to digital converter (ADC) channel. The method furthermore may comprise at least one evaluation step, wherein current is evaluated. At least one evaluation device may be used for evaluating the measured current and for determining the concentration of the analyte therefrom. As used herein, the term "evaluation device" generally refers to an arbitrary device being configured to derive at least one item of information from data. The evaluation device may be configured to derive the at least one item of information regarding the presence and/or concentration of the analyte in the body fluid from the current. As an example, the evaluation device may be or may comprise one or more integrated circuits, such as one or more application-specific integrated circuits (ASICs), and/or one or more data processing devices, such as one or more computers, preferably one or more microcomputers and/or microcontrollers. Additional components may be comprised, such as one or more pre-processing devices and/or data acquisition devices, such as one or more devices for receiving and/or preprocessing of the electrode signals, such as one or more converters and/or one or more filters. Further, the evaluation device may comprise one or more data storage devices. Further, as outlined above, the evaluation device may comprise one or more interfaces, such as one or more wireless interfaces and/or one or more wire-bound interfaces. The evaluation device may comprise a microprocessor, a cellular phone, a smart phone, a personal digital assistant, a personal computer, or a computer server.

This disclosure further discloses and proposes a computer program including computer-executable instructions for performing the method for determining a concentration of at least one analyte and/or the method for determining at least one membrane property according to this disclosure in one or more of the embodiments enclosed herein, when the program is executed on a computer or computer network. Specifically, the computer program may be stored on a computer-readable data carrier. Thus, specifically, one, more than one or even all of method steps, as indicated above, may be performed by using a computer or a computer network, preferably by using a computer program.

This disclosure further discloses and proposes a computer program product having program code means, in order to perform the method for determining a concentration of at least one analyte and/or the method for determining at least one membrane property according to this disclosure in one or more of the embodiments enclosed herein, when the program is executed on a computer or computer network. Specifically, the program code means may be stored on a computer-readable data carrier.

Further, this disclosure discloses and proposes a data carrier having a data structure stored thereon, which, after loading into a computer or computer network, such as into a working memory or main memory of the computer or computer network, may execute the methods according to one or more of the embodiments disclosed herein.

This disclosure further proposes and discloses a computer program product with program code means stored on a machine-readable carrier, in order to perform at least one of the methods according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier. Specifically, the computer program product may be distributed over a data network.

Finally, this disclosure proposes and discloses a modulated data signal which contains instructions readable by a computer system or computer network, for performing the methods according to one or more of the embodiments disclosed herein.

Preferably, referring to the computer-implemented aspects of this disclosure, one or more of the method steps or even all of the method steps of at least one of the methods according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, this disclosure further discloses:

A computer or computer network comprising at least one processor, wherein the processor is adapted to perform at least one of the methods according to one of the embodiments described in this description, a computer loadable data structure that is adapted to perform at least one of the methods according to one of the embodiments described in this description while the data structure is being executed on a computer, a computer program, wherein the computer program is adapted to perform at least one of the methods according to one of the embodiments described in this description while the program is being executed on a computer, a computer program comprising program means for performing at least one of the methods according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform at least one of the methods according to one of the embodiments described in this description after having been loaded into a main and/or working storage of a computer or of a computer network, and a computer program product having program code means, wherein the program code means can be stored or are stored on a storage medium, for performing at least one of the methods according to one of the embodiments described in this description, if the program code means are executed on a computer or on a computer network.

In a further aspect of this disclosure, an analytical system for determining a concentration of at least one analyte in body fluid is disclosed. The analytical system comprises at least one analyte sensor, wherein the analyte sensor comprises at least two measurement electrodes, wherein at least one of the measurement electrodes comprises at least one membrane element having at least one membrane property. The analytical system comprises at least one signal generator device configured for generating at least one fast-transient voltage signal, wherein the signal generator device is configured for applying the fast-transient voltage signal to the two measurement electrodes. The analytical system comprises at least one measurement unit configured for receiving at least one response signal. The analytical system comprises at least one evaluation device. The evaluation device is configured for determining the at least one membrane property by evaluating of the response signal.

The analytical system may be configured for performing the methods according to this disclosure. For definitions of the features of the analytical system and for optional details of the analytical system, reference may be made to one or more of the embodiments of the methods as disclosed above or as disclosed in further detail below.

As further used herein, the term "system" refers to an arbitrary set of interacting or interdependent component parts forming a whole. Specifically, the components may interact with each other in order to fulfill at least one common function. The at least two components may be handled independently or may be coupled or connectable. Thus, the term "analytical system" generally refers to a group of at least two elements or components which are capable of interacting in order to perform at least one analytical detection, specifically at least one analytical detection of at least one analyte of the sample. The analytical system may be an apparatus, specifically comprising at least two components.

The term "measurement unit" generally may refer to an arbitrary device, preferably an electronic device, which may be configured to detect at least one signal, in particular the response. The measurement unit may be configured for measuring the response signal generated in response to fast-transient voltage signal and/or the current at the counter electrode. The measurement unit may be configured for receiving the response signal and the current at the counter electrode at the same time or at at least two different time points.

The analyte sensor may be a two-electrodes sensor or a three-electrodes sensor. The measurement electrodes may be arranged on opposing sides of the analyte sensor.

Summarizing the findings of this disclosure, the following embodiments are preferred.

Embodiment 1: Method for determining at least one membrane property of an analyte sensor, wherein the analyte sensor comprises at least two measurement electrodes, wherein at least one of the measurement electrodes comprises at least one membrane element having the at least one membrane property, the method comprising the following steps:
 a) generating at least one fast-transient voltage signal and applying the fast-transient voltage signal to the measurement electrodes;
 b) measuring at least one response signal;
 c) determining the at least one membrane property by evaluating of the response signal.

Embodiment 2: The method according to embodiment 1, wherein the evaluating of the response signal comprises determining equivalent series resistance of the analyte sensor and determining the at least one membrane property from the equivalent series resistance of the analyte sensor.

Embodiment 3: The method according to any one of embodiments 1 or 2, wherein the analyte sensor is an in vivo sensor.

Embodiment 4: The method according to any one of embodiments 1 to 3, wherein the method is performed during in vivo measurement.

Embodiment 5: The method according to any one of embodiments 1 to 4, wherein the method is performed during manufacturing of the analyte sensor.

Embodiment 6: The method according to any one of embodiments 1 to 5, wherein the method comprises at least one failsafe step, wherein the failsafe step is triggered depending on the determined membrane property.

Embodiment 7: The method according to embodiment 6, wherein the failsafe step comprises generating at least one information about a condition of the membrane element.

Embodiment 8: The method according to any one of embodiments 1 to 7, wherein the membrane property is permeability of the membrane element.

Embodiment 9: The method according to any one of embodiments 1 to 8, wherein the fast-transient voltage signal has a square wave form or a sine wave signal form.

Embodiment 10: The method according to any one of embodiments 1 to 9, wherein the fast-transient voltage signal comprises a non-continuous signal such as a pulse, wherein a pulse duration is $\leq 20$ μs, preferably $\leq 10$ μs.

Embodiment 11: Method for determining a concentration of at least one analyte in body fluid using at least one analyte sensor, wherein the analyte sensor comprises at least two measurement electrodes, wherein at least one of the measurement electrodes comprises at least one membrane element having at least one membrane property, wherein the method comprises determining at least one membrane property of the analyte sensor according to any one of embodiments 1 to 10, wherein the method comprises at least one analyte measurement step, wherein in the measurement step at least one measurement value of the concentration of the analyte is determined.

Embodiment 12: A computer program comprising program means for performing the method according to any one of embodiments 1 to 10 and/or the method according to embodiment 11 while the computer program is being executed on a computer or on a computer network.

Embodiment 13: A computer loadable data structure that is configured for performing the method according to any one of embodiments 1 to 10 and/or the method according to embodiment 11 while the data structure is being executed on a computer.

Embodiment 14: A computer program product having program code means, wherein the program code means can be stored or are stored on a storage medium, for performing the method according to any one of embodiments 1 to 10 and/or the method according to embodiment 11, if the program code means are executed on a computer or on a computer network.

Embodiment 15: A computer or computer network comprising at least one processor, wherein the processor is adapted to perform the method according to any one of embodiments 1 to 10 and/or the method according to embodiment 11.

Embodiment 16: An analytical system for determining a concentration of at least one analyte in body fluid, wherein the analytical system comprises at least one analyte sensor, wherein the analyte sensor comprises at least two measurement electrodes, wherein at least one of the measurement electrodes comprises at least one membrane element having at least one membrane property, wherein the analytical system comprises at least one signal generator device configured for generating at least one fast-transient voltage signal, wherein the signal generator device is configured for applying the fast-transient voltage signal to the two measurement electrodes, wherein the analytical system comprises at least one measurement unit configured for receiving at least one response signal, wherein the analytical system comprises at least one evaluation device, wherein the evaluation device is configured for determining the at least one membrane property by evaluating of the response signal.

Embodiment 17: The analytical system according to embodiment 16, wherein the analyte sensor is a two-electrodes sensor or a three electrode sensor.

Embodiment 18: The analytical system according to any one of embodiments 16 or 17, wherein the measurement electrodes are arranged on opposing sides of the analyte sensor.

Embodiment 19: The analytical system according to any one of embodiments 16 to 18, wherein the analytical system is configured for performing the method according to any one of embodiment 1 to 10 and/or the method according to embodiment 11.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
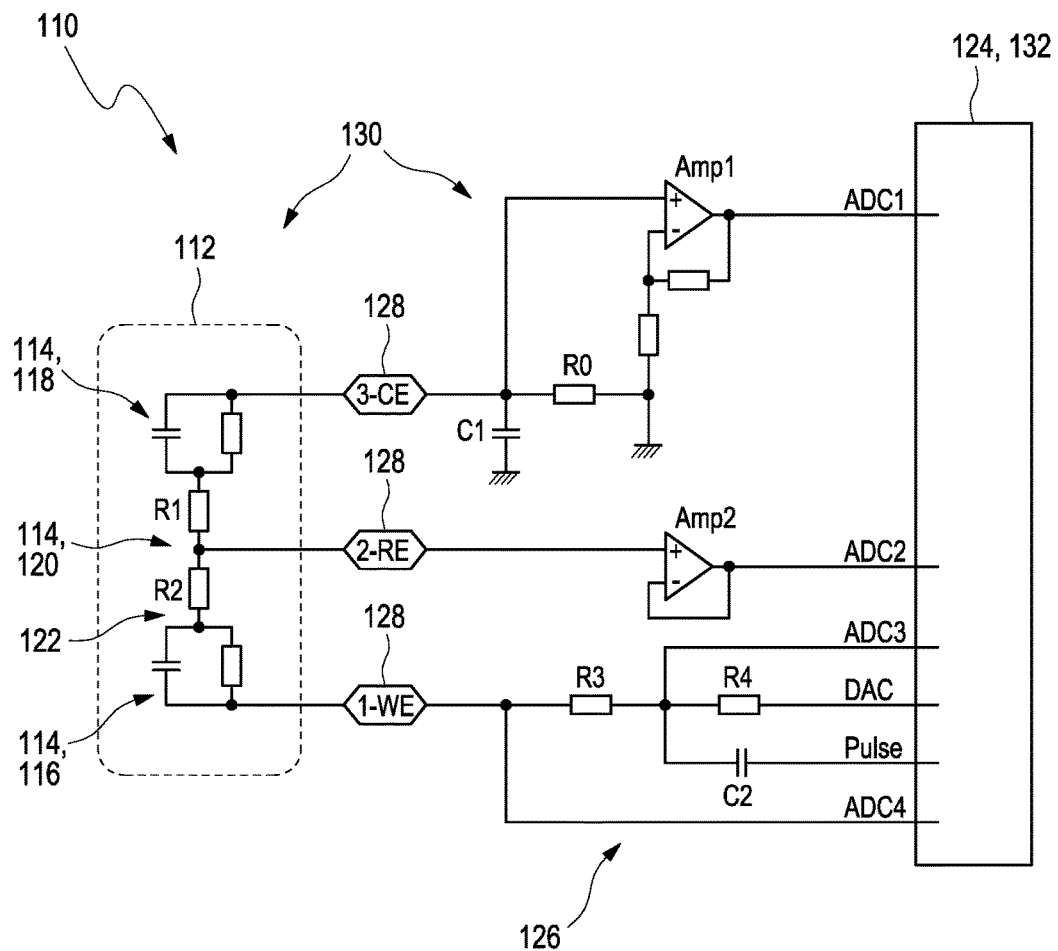
FIG. 1 shows a schematic representing at least one analytical system according to this disclosure.

FIG. 1 shows a schematic representing at least one analytical system 110 for determining a concentration of at least one analyte in body fluid according to this disclosure. The analytical system 110 comprises at least one analyte sensor 112 shown here as equivalent circuit.

The analyte may be or may comprise an arbitrary chemical substance or chemical compound which may take part in the metabolism of the user, such as at least one metabolite. As an example, the at least one analyte may be selected from the group consisting of glucose, cholesterol, triglycerides, lactate. Additionally or alternatively, however, other types of analytes may be determined and/or any combination of analytes may be determined.

In an embodiment, the analyte sensor 112 may be an optical sensor.

The analyte sensor 112 may be an in vivo sensor. The analyte sensor 112 may be configured for being at least partially implanted into a body tissue of a user. The analyte sensor 112 may be a subcutaneous analyte sensor. The analyte sensor 112 may be configured for implantation into a body tissue of the user. More specifically the analyte sensor 112 may be configured for continuous monitoring of the analyte.

The analyte sensor 112 comprises at least two measurement electrodes 114. The at least two measurement electrodes 114 may be designed such that an electrochemical reaction may take place at one or more of the electrodes. Thus, the measurement electrodes 114 may be embodied such that an oxidation reaction and/or reduction reaction may take place at one or more of the electrodes.

One of the measurement electrodes 114 may be designed as working electrode 116. In FIG. 1 for the working electrode 116 a capacitance representing the electric double layer and a resistance representing the charge transfer resistance is shown. The working electrode 116 may comprise at least one test chemical. The working electrode 116 may fully or partially be covered with at least one test chemical, specifically at least one test chemical comprising at least one enzyme for detecting the at least one analyte. As an example, glucose oxidase (GOx) or glucose dehydrogenase (GDH) may be used. The test chemical, further, may comprise additional materials, such as binder materials, electrode particles, mediators or the like. Thus, as an example, the test chemical may comprise at least one enzyme, carbon particles, a polymer binder and $MnO_2$-particles. In another preferred embodiment, the test chemical may comprise a mediator polymer comprising a polymeric material and a metal containing complex, for example a modified poly(vinylpyridine) backbone loaded with poly(bi-imidizyl) Os complexes covalently coupled through a bidentate linkage. Further, the at least one test chemical may be comprised in a single layer, or the test chemical may comprise a plurality of layers, such as one layer having the at least one enzyme and one or more additional layers having one or more additional functions, such as one or more diffusion barriers and/or one or more biocompatibility layers.

The other one of the measurement electrodes 114 may be designed as counter electrode 118. The counter electrode may be a part of the implanted or partially implanted analyte sensor, or may be an individual electrode, which is either implanted or partially implanted or placed somewhere else on the body, e.g., on the skin surface. In FIG. 1 for the counter electrode 118 a capacitance representing the electric double layer and a resistance representing the charge transfer resistance is shown. The counter electrode 118 may be configured for performing at least one electrochemical counter reaction and/or configured for balancing a current flow required by the detection reaction at the working electrode 116. In case of the analyte sensor 112 comprises a two electrode system as measurement electrodes 114, the counter electrode 118 may complete the circuit such that charge can flow through an electrochemical cell, also denoted electrochemical system, given by the working electrode 116, the counter electrode 118 and an electrolyte, such as the body fluid, and may maintain a constant counter electrode potential, also referred to as a constant reference potential, regardless of current.

Additionally, the analyte sensor 112 may comprise at least one reference electrode 120. The reference electrode 120 may be configured for being a reference for measuring and/or controlling a potential of the working electrode 116. The reference electrode 120 may have a stable and well-known electrode potential. The electrode potential of the reference electrode 120 may preferably be highly stable. One of the electrodes may have several functionalities, as for instance, combined reference and counter electrode, which has both, the function of the reference electrode 120 and counter electrode 118, which means it provides a reference potential and balances the current flow from the working electrode 116.

At least one of the measurement electrodes 114 comprises at least one membrane element 122 having at least one membrane property. In FIG. 1, the resistance of the electrolyte between the working electrode 116 and the reference electrode 120 may be given by an electric resistance $R_2$ and the resistance of the electrolyte between the counter electrode 118 and the reference electrode 120 may be given by an electric resistance $R_1$. The resistance $R_2$ may further be dependent on properties of the membrane element 122 denoted with an arrow and reference number of the membrane element at the electric resistance $R_2$. Specifically, the membrane element 122 may be applied to the working electrode 116. The membrane element 122 may be configured for controlling and/or limiting diffusion of the analyte to the working electrode 116. Thus, the membrane element 122 may be configured as diffusion limiting membrane. However, the membrane element 122 may have even more functionalities, such as providing biocompatibility. The membrane element 122 may have further functions such as blocking of leakage of components below the membrane element 122 such as of the enzyme or other components comprised in any one of the at least two measurement electrodes. The membrane element 122 may also be configured as a blocking membrane. The blocking may refer to preventing leakage of inner components of a sensitive layer of the working electrode 116 but not to the analyte. The membrane element 122 may be configured for maintaining of sensor integrity, by for instance keeping the enzyme or redox mediator from leaching, thus gradation of the whole sensor. Independently on the role of the membrane element 122, its altering may be compensated.

The membrane element 122 may comprise at least one polymer. The membrane element 122 may be applied to the working electrode 116 as thin polymer film. For example, the membrane element may be or may comprise Poly-(4-(N-(3-sulfonatopropyl)pyridinium)-co-(4vinyl-pyridine)-co-styrene (5%/90%/5%) or hydrophilic Polyurethane (HP60D20) available from Lubrizol®. For example, the membrane element may comprise at least one of the following polymer classes and/or their copolymer: Poly(4 vinyl pyridine), Polymethacrylate, Polyacrylate, Polyvinyl pyrrolidone, Polyvinyl alcohol (PVA), Polyethylene glycol.

The analytical system 110 may be configured for determining the at least one membrane property. Permeability of the membrane element 122 for certain compounds may be proportional to the membrane's swelling degree. The swelling degree may correspond to the degree of water uptake. The swelling degree of the membrane 122 may depend on its hydrophilicity. The membrane's swelling degree may directly affect the amount and/or mobility and, thus, the permeability of the membrane for certain compounds. The conductivity of an electrolyte like water or bodily fluid, such as interstitial fluid is directly linked to so-called total dissolved solids whereby ions, such as H+, OH—, Na+, K+, Cl— and other have the most contribution. Therefore, also the conductivity of the membrane 122 which has taken up water or bodily fluid such as interstitial fluid also is directly linked to the total dissolved solids. The more charge carriers are present and the more mobile they are, the lower is the measured electrical resistance, by otherwise constant conditions, such as, e.g., cell geometry. Thus, the electrical resistance, or reversely, electric conductivity of the membrane element 122 may depend on quantity and mobility of ions present in the membrane. The analytical system 110 may be configured for using at least one algorithm configured for determining permeability of the membrane element 122 for a specific analyte, in particular glucose, by evaluating electrical resistance of the membrane element 122. The permeability of the membrane element 122 for a specific analyte $p_{Analyt}$ may be determined by $p_{Analyt}=f*p$, wherein p is the permeability determined via the electrical resistance of the membrane element 122 and f is a conversion factor. The conversion factor may be determined in calibration experiments using known glucose values.

The membrane property, in particular the permeability, may depend on different parameters such as temperature, composition of interstitial fluid, thickness of the membrane element, aging, swelling degree, mechanical stresses and the like. The analytical system 110 may be configured for performing at least one calibration step, wherein effects of the different parameters on the permeability of the membrane element 122 may be determined. For each of the parameters influencing permeability of the membrane element 122 at least one correction factor may be determined by calibration experiments. The analytical system may be configured for determining correction factors for interdependent parameters. The analytical system 110 may be configured for determining permeability of the membrane element 122 considering the at least one correction factor. The analytical system 110 may be configured for in-operando monitoring of permeability, in particular continuously or in short time intervals. Also temperature monitoring is possible. The analytical system 110 may be configured for performing at least one failsafe step in order to enhance reliability of the determining of the analyte concentration.

The analytical system 110 comprises at least one signal generator device (or "signal generator") 124 configured for generating at least one fast-transient voltage signal. The signal generator device 124 is configured for applying the fast-transient voltage signal to the two measurement electrodes 114.

The fast-transient voltage signal may be at least one arbitrary voltage signal applicable to the at least two measurement electrodes 114 having fast-transient signal flanks, in particular two very steep edges. The fast-transient voltage signal may comprise a square wave form and/or a sine wave form. The fast-transient voltage signal may comprise a non-continuous signal such as a pulse. Specifically, the fast-transient voltage signal may comprise a fast transition square wave. The pulse may have a transient change in the amplitude of the signal from a first value, also denoted baseline value, to a second value, followed by a return to the baseline value or at least approximately to the baseline value. The second value may be a higher or lower value than the baseline value. A pulse duration may be $\leq 50$ µs, preferably $\leq 20$ µs, more preferably $\leq 10$ µs. The duration of the single pulse must be sufficiently long to be able to record its propagation. The duration of the single pulse must be preferentially short, in order to not excite the system electrochemically. The fast-transient voltage signal may be applied during at least one test sequence, for example a time sequence. The fast-transient voltage signal may be applied repeatedly, in particular periodically. The time distance between the cycles must be sufficiently long in order to keep the system at its steady-state. The fast-transient voltage signal may comprise a repeatable cycle, wherein the repeatable cycle comprises at least one signal flank. The signal flank may be a transition of a signal amplitude from low to high signal value or from high to low signal value. The signal flank may be a rising signal flank or a falling signal flank. The signal flank of the fast-transient voltage signal may have a change in signal from the first value of the signal flank to the second value of the signal flank in a microsecond to nanosecond range. The signal flank of the fast-transient voltage signal may have a change in signal from the second value of the signal flank to the first value of the signal flank in a microsecond to nanosecond range. The terms first and second "value" may refer to regions or points of the fast-transient voltage signal, in particular signal amplitude. The first value may be the baseline value. The first value may be a local and/or overall minimum of the fast-transient voltage signal. The first value may be a first plateau of the fast-transient voltage signal. The first value may refer to a time point with no voltage is applied to the measurement electrodes. The first value may be a through or low value of the fast-transient voltage signal. The second value may be a local and/or overall maximum of the fast-transient voltage signal. The second point may be a second plateau of the fast-transient voltage signal, which may be reached during application of the fast-transient voltage signal. The second point may be a peak or high value of the fast-transient voltage signal. The fast-transient voltage signal may have a rising signal flank and a falling signal flank. The fast-transient voltage signal may have steep edges. Specifically, the fast transition square wave may have a change in signal from the first value of the signal flank to the second value of the signal flank below or equal 50 ns, preferably below or equal 20 ns. The change in signal from the first value of the signal flank to the second value of the signal flank may be even faster and may be only limited by electronics such as by an analog-to-digital-converter. The faster the flank and the sharper the transition to the plateau, the more resolution may be between the ohmic part of the system resistance and the capacitive part of the system capacitance. Without wishing to being bound by theory, the fast-transient voltage signal is so short, in particular ultrashort, that no faradaic currents are generated and that an electrochemical system of the analyte sensor 112 is not disturbed and brought out of equilibrium. The ultrashort voltage signal of the fast-transient voltage signal for determining the membrane property may allow that a measurement signal for determining the analyte concentration can be undisturbed determined. The ultrashort voltage signal may prevent that side reaction occur.

The signal generator device 124 may comprise at least one function generator selected from the group consisting of: at least one square wave generator and at least one sine wave generator. The signal generator device 124 may be part of measurement electronics of the analyte sensor 112 and/or may be connected to the analyte sensor 112 and may be designed as a separate device.

The analytical system 110 comprises and/or may be directly connectable to at least one measurement unit 126, in particular at least one microcontroller unit (MCU) or an analog front end (AFE), configured for receiving at least one response signal. The analyte sensor 110 may comprise and/or may be directly connectable to the MCU or AFE. For example, the analyte sensor 110 may comprise sensor contacts 128 via which the analyte sensor 112, in particular the measurement electrodes 114 can be connected to the MCU. The signal generator device 124 may be part of the MCU or may be a separate device. The signal generator device 124 may be configured for applying the fast-transient voltage signal to the measurement electrodes 114. The MCU may comprise at least one digital output, in particular a first digital to analog converter DAC output, denoted "Pulse" in FIG. 1, via which the fast-transient voltage signal can be generated and/or applied to the measurement electrodes 114. The fast-transient voltage signal may be applied to at least two measurement electrodes 114 in at least one signal application step. The fast-transient voltage signal may be applied to the working electrode 116.

The response signal may be a measured propagation of the applied fast-transient voltage signal. The response signal may refer to equivalent series resistance of the analyte sensor 112. The MCU or AFE may be configured for determining the voltage at the working electrode 116 during application of the fast-transient voltage signal.

The analyte sensor 112 may comprise and/or may be connected to at least one potentiostat 130 and/or may be part of at least one potentiostat 130, in particular at least one analog or digital potentiostat, configured for determining the concentration of the analyte. Operating principles of potentiostats for continuous monitoring of analytes are generally known to the person skilled in the art. The potentiostat 130 may be configured for generating and/or applying of at least one measurement voltage signal, in particular a polarizing potential or voltage. For example, the potentiostat may be based on a MCU which may comprise at least one second Digital to Analog converter (DAC), denoted DAC in FIG. 1, or at least one PWM output, optionally with a low pass filter for generating and/or applying of at least one measurement voltage signal.

The measurement voltage signal may be a voltage signal used for determining the concentration of the analyte. The measurement voltage signal may be different to the fast-transient voltage signal. In particular, the measurement voltage signal may be longer compared to the fast-transient voltage signal. The measurement voltage signal may be a permanent signal, not a pulsed one. The measurement voltage signal may be adjusted from time to time or continuously in order to give the analyte sensor its polarization voltage, preferably, in order to keep the predefined polarization voltage at the analyte sensor. The measurement voltage signal may a continuous direct current (DC) signal which polarizes the electrochemical cell, and serves as the "motor" for the amperometric measurement of the analyte reducing or oxidizing GO.x across the electrochemical cell. The fast-transient voltage signal may be a voltage pulse with high frequency that only characterizes the capacitive and ohmic parts of the electrochemical cell. Therefore, the measurement voltage signal and the fast-transient voltage signal may not influence each other, since they have completely different time domains.

The potentiostat 130 may comprise at least two Analog to Digital channels (ADC) for determining voltage output at the two measurement electrodes. In case of using a reference electrode, the potentiostat 130 may comprise four Analog to Digital channels. The MCU may be configured for regulating the output of its "DAC" in order to get a wanted polarization voltage, for example 50 mV, between the reference electrode 120 and the working electrode 116. The measurement voltage signal may be the output signal of the "DAC." The current flowing through the analyte sensor 112 may be measured on the counter electrode 118 by using an ohmic resistance and at least one first operational amplifier, denoted Amp1 in FIG. 1, connected with the counter electrode 118. The output of said first operational amplifier may be connected to a first ADC channel, denoted ADC1 in FIG. 1. The reference electrode 120 may be a high-impedance electrode and may control the potential of the potentiostat 130. A second operational amplifier, denoted Amp2 in FIG. 1, may be connected to the reference electrode 120 in order to guarantee that no current is flowing out of the reference electrode 120. The potential between the reference electrode 120 and the working electrode 116 may be controlled via a second ADC channel, denoted ADC2 in FIG. 1, and a fourth ADC channel, denoted ADC4 in FIG. 1, wherein, for example, the second ADC channel may be connected to the output of the second operational amplifier and the fourth ADC channel may be connected to the working electrode 116.

For measuring the response signal to the fast-transient voltage signal the analyte sensor 112 and/or the MUC may comprise further components. For example, the microcontroller unit may comprise two additional capacitors, two additional resistors, one additional ADC channel and the first digital output, as outlined above. One of the additional capacitors, denoted C1 in FIG. 1, may be connected to a non-inverting input of the first operational amplifier connected to the counter electrode 118. The other additional capacitor, denoted C2 in FIG. 1, may be arranged in series with the first digital output of the MUC. The third ADC channel, denoted ADC3 in FIG. 1, may be connected to the working electrode 116 such that the two ADC channels, i.e., the third and the fourth ADC channel, are connected to the working electrode 116. The fourth ADC channel may be connected directly to the working electrode 116. The fast-transient voltage signal may be applied to the working electrode 116 in series with a reference resistance, denoted $R_3$. $R_3$ may be a known reference resistance such as a predetermined reference resistance. The reference resistance may be an average value determined, specifically pre-determined, from a plurality of reference measurements. The reference resistance must reflect the measurement range of the cell. This reference resistance may reflect required measurement tolerances which must be maintained for correct system resistances. The reference resistance may be selected suitable for determining a value to be measured such as the electrical resistance of the membrane element. The fast-transient voltage signal may be determined such as by using the third ADC channel which may be placed in series and between the first digital output and the reference resistor $R_3$. Specifically, before the application of the fast-transient voltage signal an output of the third ADC channel may correspond to the measurement voltage signal. After the application of the fast-transient voltage signal an output of the third ADC channel may correspond to the sum of the measurement voltage signal and the fast-transient voltage signal. The potentiostat 130 may be configured for determining the propagation of the fast-transient voltage signal applied to the working electrode 116. The potentiostat 130 may be configured for determining a change or difference $\Delta V_{ex}$ of the measurement voltage signal at the working electrode 116 before application of the fast-transient voltage signal and during the application of the fast-transient voltage signal. The potentiostat 130 may be configured for determining a change or difference $\Delta V_{prop}$ of voltage at the reference resistor $R_3$ before application of the fast-transient voltage signal and during the application of the fast-transient voltage signal.

The analyte sensor may comprise at least one isolating resistor, denoted $R_4$ configured for isolating the low impedance DAC output, in particular the measurement voltage signal or cell polarization voltage, from the fast transient voltage signal. Without $R_4$ the pulse would be absorbed by the DAC and not the electrochemical cell. The two additional resistors may be arranged in series. A first additional resistor, denoted $R_4$, may be connected with the second DAC and with $R_3$, also denoted second additional resistor. The second additional resistor may be connected to the working electrode 116. The third ADC channel may be arranged between the first additional resistor and the second additional resistor.

The analytical system 110 comprises at least one evaluation device 132. The evaluation device 132 is configured for determining the at least one membrane property by evaluating of the response signal. The evaluating of the response signal may comprise determining equivalent series resistance of the electrochemical system of the analyte sensor 112 and determining the at least one membrane property from the equivalent series resistance of the electrochemical system of the analyte sensor 112.

Figure 2:
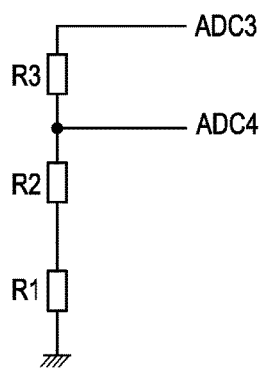
FIG. 2 shows an equivalent circuit for measuring equivalent series resistance of at least one analyte sensor using a method according to this disclosure.

In order to measure the membrane property, in particular equivalent series resistance of the electrochemical system, the fast-transient voltage signal may be sent to the working electrode 116. The edges of the fast-transient voltage signal are very steep such that the additional capacitors and equivalent capacitors of the electrochemical system of the analyte sensor act like short-circuits. The equivalent circuit in this condition is shown in FIG. 2. The equivalent series resistance of the electrochemical system of the analyte sensor 112 may be determined by $$R_1 + R_2 = R_3 \frac{\Delta V_{prop}}{\Delta V_{ex} - \Delta V_{prop}} = R_3 \frac{V_{prop, during\ Pulse} - V_{prop, before\ Pulse}}{(V_{ex, during\ Pulse} - V_{ex, before\ Pulse}) - (V_{prop, during\ Pulse} - V_{prop, before\ Pulse})},$$

wherein $V_{prop, beforePulse}$ refers to the voltage at the working electrode before applying the fast-transient voltage signal, $V_{ex, beforePulse}$ measurement voltage signal at the reference resistor before applying the fast-transient voltage signal, $V_{prop, duringPulse}$ refers to the voltage at the working electrode during applying the fast-transient voltage signal, $V_{ex, duringPulse}$ refers to the measurement voltage signal at the reference resistor during applying the fast-transient voltage signal. Before the application of the fast-transient voltage signal $V_{ex, beforePulse}$ may correspond to a voltage at the reference resistor in response to the measurement voltage signal. After the application of the fast-transient voltage signal $V_{ex, duringPulse}$ may correspond to the voltage at the reference resistor in response to the measurement voltage signal and due to the propagation of the fast-transient voltage signal. The method further may comprise at least one subtracting step, wherein from the determined equivalent series resistance a predetermined or known value of the electrolyte resistance $R_1+R_2$ of the electrolyte is subtracted.

The analyte sensor 112 may an in vivo sensor, specifically at least one in vivo continuous glucose sensor. The determining of the membrane property may be performed an in-process control. The determining of the membrane property may be performed during in vivo measurement. The determining of the membrane property may be performed in-operando. Specifically, the determining of the membrane property may be performed during determining of the concentration of the analyte. Additionally or alternatively, determining of the membrane property may be performed during manufacturing of the analyte. For example, the manufacturing process may comprise at least one calibration, wherein the analyte sensor 112 may be operated with a sample of known analyte concentration.

The technical realization of the measurement setup may be simple and requires only a minimum amount of additional components in addition to a known potentiostat. The determined response signal may not require further processing and may can be directly digitalized. The measured response signal may provide absolute values and not relative changes. The determined electrical resistance may be very selective to the membrane property. In particular, the measured electrical resistance may not comprise resistance relating to charge transfer processes of the electrochemical system. Thus, it may be possible to exclude the influences, e.g., of the test chemistry, to the response signal.

Figure 3:
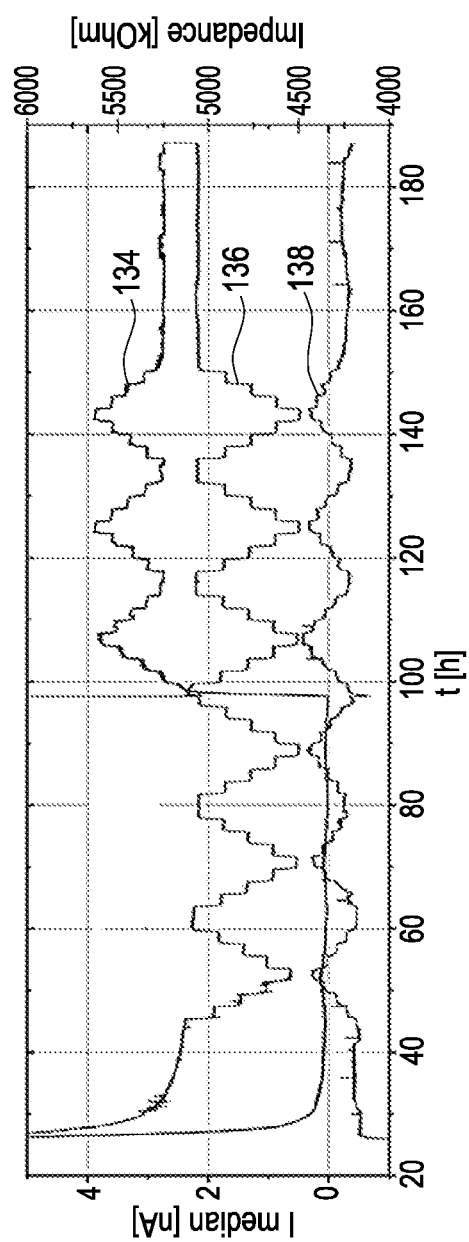
FIGS. 3A to 3C show dependency on temperature of equivalent series resistance of the analyte sensor and time development of response signal and of current for determining of concentration of at least one analyte.
Figure 3:
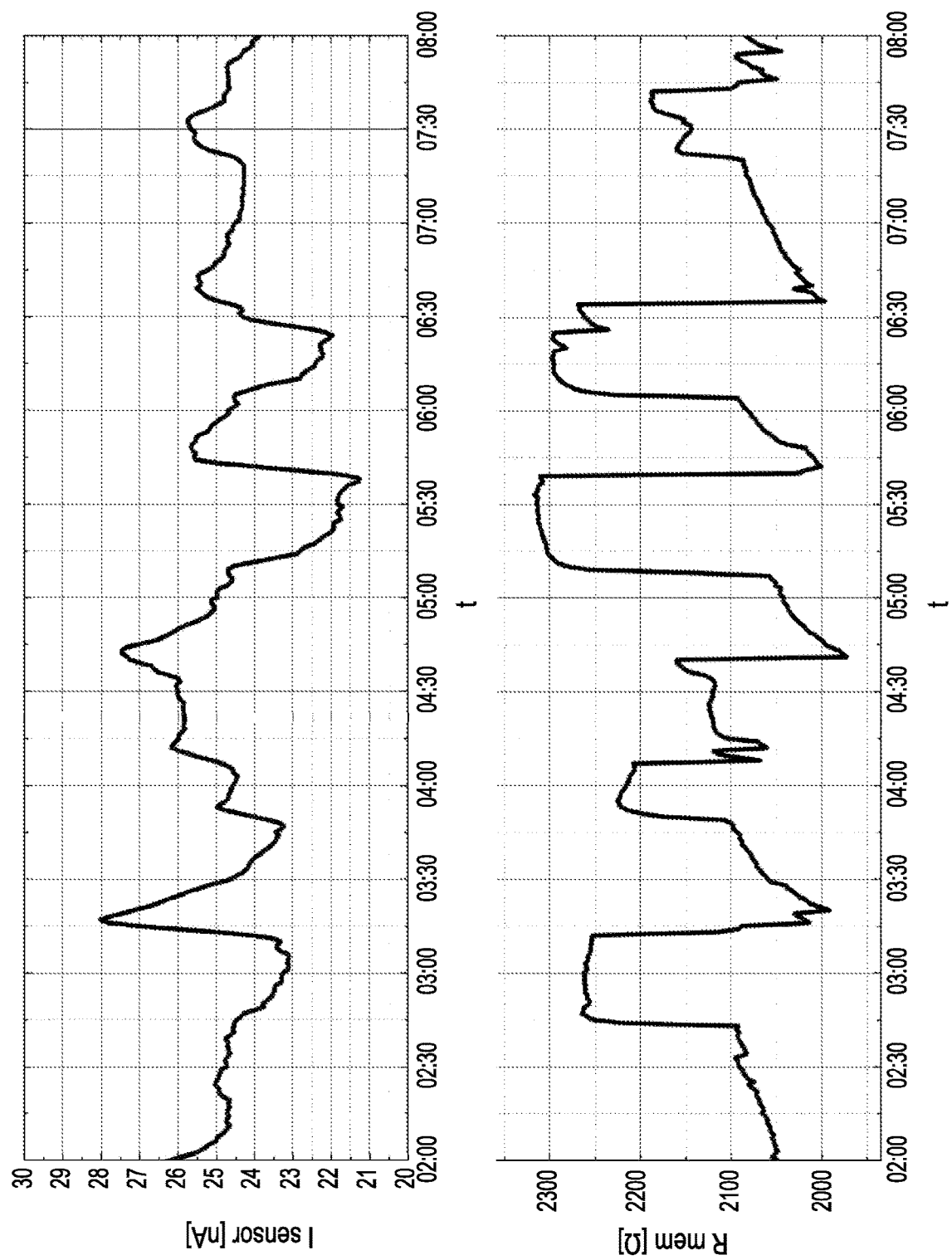
Figure 3:
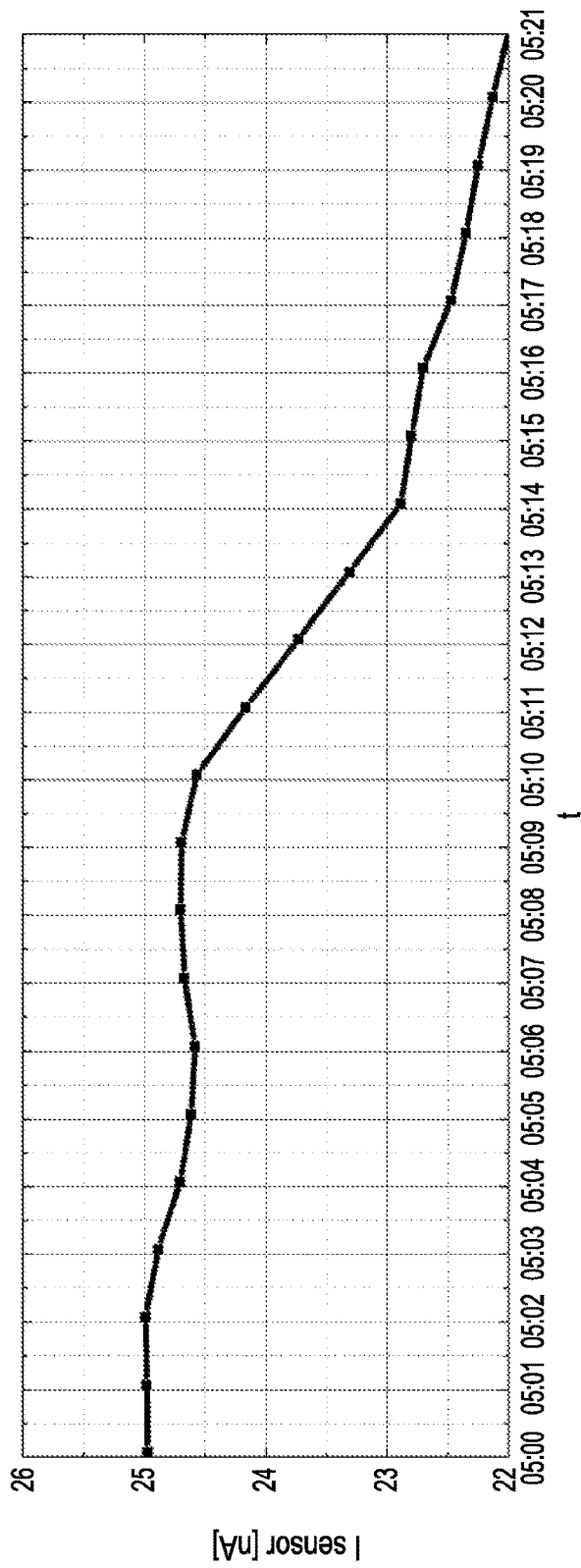
Figure 3:
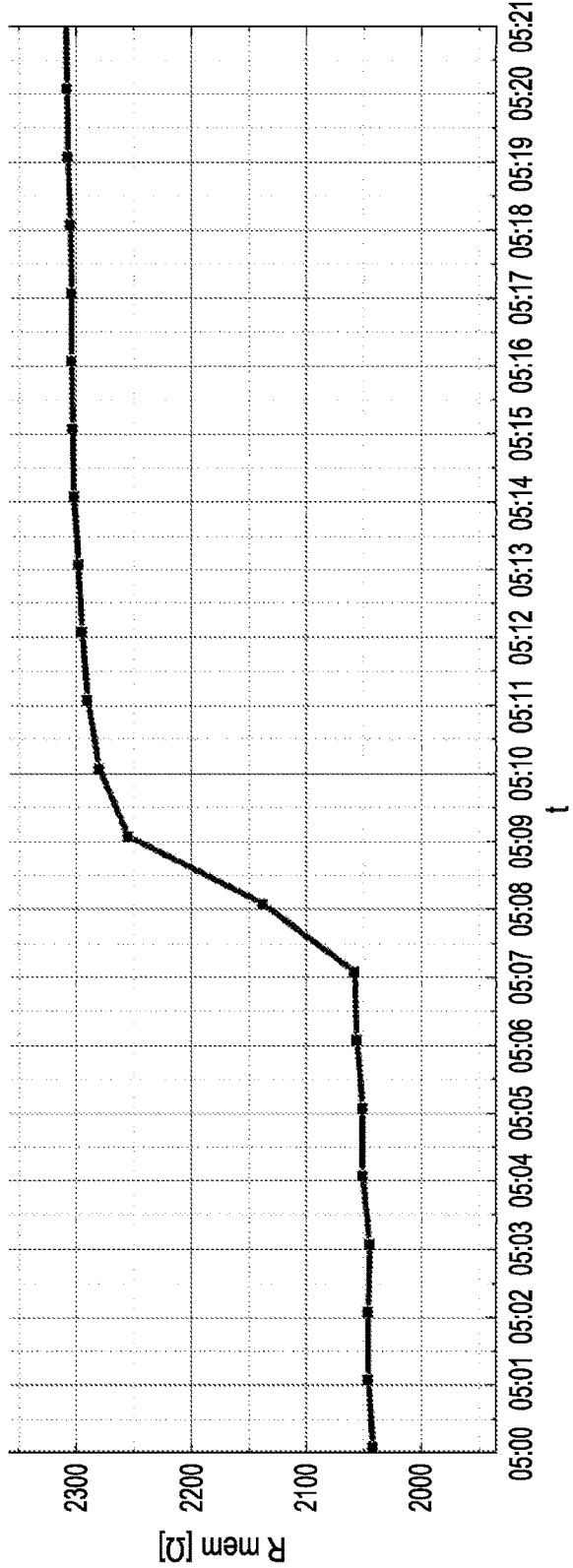

FIGS. 3A to 3C show experimental data. FIG. 3A shows a dependency on temperature of equivalent series resistance of the analyte sensor 112. Specifically, current curve 134 shows the median current $I_{median}$ in nA as a function of time t in hours, equivalent series resistance curve 136 shows the equivalent series resistance of the analyte sensor 112 in kOhm and temperature curve 138 shows the temperature over time in ° C. A change in equivalent series resistance depending on the temperature is observed.

FIG. 3B, upper part, shows the sensor current $I_{sensor}$ measured during a night. The observed rapid signal changes are caused by mechanical stress due to the fact that the patient lies on the sensor patch from time to time. Because of the pressure, the tissue and the by it surrounded sensor are compressed and this alters reversibly the membrane permeability. This effect can be clearly observed by monitoring the membrane resistance $R_{mem}$, depicted in the lower part of FIG. 3B, measured using the method according to this disclosure. The abrupt growth of the membrane resistance is observed once the patient lies on the sensor patch and it drops abruptly, once the weight load is removed. Thanks to the fact, that the membrane impedance change preempts the change in the current, it is possible to, e.g., avoid false hypo alarms. FIG. 3C shows a magnified fragment of the both curves, clearly showing, that the resistance change is preempting the current changes for few minutes. The shape of the resistance vs. time curve during the mechanical stress is very specific, which allows easy detection of the event.

Figure 4:
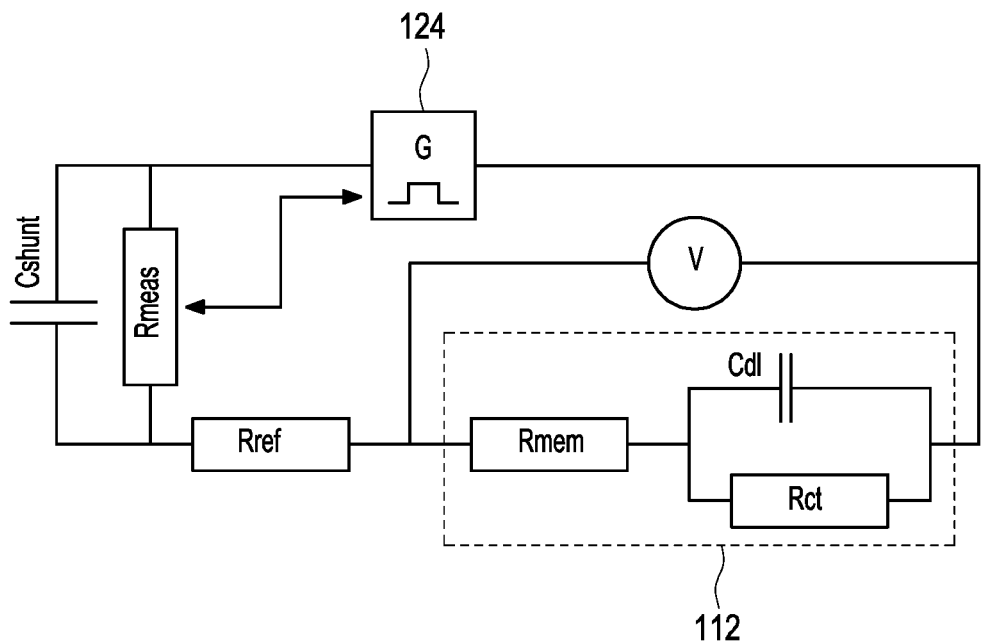
FIGS. 4A and 4B show a simplified circuit and a fast-transient voltage profile.
Figure 4:
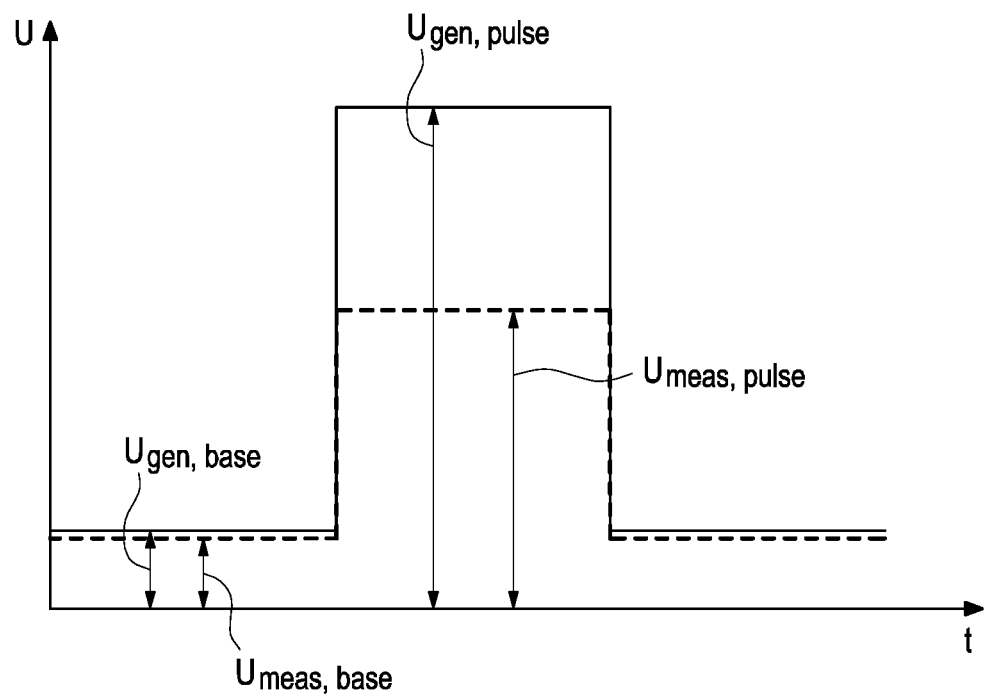

FIGS. 4A and 4B show a further example of an operating principle according to this disclosure. FIG. 4A shows a simplified circuit and FIG. 4B shows a fast-transient voltage profile. Specifically, the method may comprise the following steps:

generating the at least one fast-transient voltage $U_{gen,pulse}$ and applying it to a membrane comprising circuit serially connected with a reference resistor $R_{ref}$, wherein the membrane element has a resistance $R_{mem}$;

recording a voltage $U_{meas,pulse}$ either at the reference resistor $R_{ref}$ or at the membrane element comprising circuit $R_{mem}$;

determining the at least one membrane property by calculating the $R_{mem}$ from $U_{gen,pulse}$, $U_{meas,pulse}$ and $R_{ref}$.

The simplified circuit comprises a sensor, represented as a simple Randle's circuit, a reference resistor $R_{ref}$, a measurement resistor $R_{meas}$, a shunt capacitor $C_{shunt}$, a signal generator device 124, in this embodiment a voltage source, and a voltmeter V. The Randle's circuit comprises the charge transfer resistance $R_{ct}$, which represents the diffusion limited analyte current, double layer capacitance $C_{dl}$ at the electrode surface and the membrane element resistance $R_{mem}$. The signal generator device 124 may be configured for applying a DC base voltage $U_{gen,base}$ and fast-transient voltage $U_{gen,pulse}$. During the $U_{gen,base}$ is applied, the current flows through all four resistors in the circuit. There is no current flow through the capacitors, as they are charged to the corresponding level. The $R_{ct}$ may few orders of magnitude larger, than $R_{mem}$, thus the voltage drop at the $R_{mem}$ can be neglected in the first approximation. The same is valid for the $R_{ref}$, which is chosen to be roughly the same value as the $R_{mem}$. The value for $R_{meas}$ may be chosen at the way, to get substantial voltage drop at it, which is then measured, e.g., by an additional voltmeter or electrometer is not shown in the scheme, and converted in the sensor current signal, thus the value of the $R_{meas}$ is roughly of the same order of magnitude as the $R_{ct}$. Since the voltage drop at the $R_{meas}$ is substantial, it is compensated by the voltage source, which is in the feedback with the current measuring unit based on the $R_{meas}$.

In order to measure the $R_{mem}$, the signal generator device 124 may generates $U_{gen,pulse}$, here exemplarily higher than the DC base voltage. If the $U_{gen,pulse}$ is applied, the $C_{dl}$ and the $C_{shunt}$ start to charge causing an art of shortcut at the $R_{ct}$ and the $R_{meas}$ respectively. Thus, the whole $U_{gen,pulse}$ is distributed over the $R_{ref}$ and the $R_{mem}$. Since the $R_{ref}$ and the $R_{mem}$ comprise, in the first approximation, a simple voltage divider, the $R_{mem}$ can be easily calculated, once $U_{meas,pulse}$ is measured either at the $R_{ref}$ or at the $R_{mem}$ by means of the voltmeter. Here, exemplarily, at the $R_{mem}$ by means of voltmeter V.

In course of the $C_{dl}$ and $C_{shunt}$ charging, $U_{gen,puls}$ starts to additionally drop at, correspondingly, $R_{ct}$ and $R_{meas}$, which is not desired. Furthermore, the additional voltage at the $R_{ct}$ means additional undesired current flow through the sensor caused, for instance, by unspecific oxidation of further substances, which must be avoided. Thus, the duration of $U_{gen,pulse}$ may be kept sufficiently short, in order to exclude the excessive $C_{dl}$ and $C_{shunt}$ charging and thus excessive voltage rise at $R_{ct}$ and $R_{meas}$. Correspondingly, the data acquisition rate of the voltmeter V may be sufficiently high, in order to record the $U_{meas,pulse}$ possibly immediately after applying $U_{gen,pulse}$.

The calculation of the $R_{mem}$ may be done as $$R_{mem} = R_{ref} \frac{U_{meas,pulse}}{U_{gen,pulse} - U_{meas,pulse}}.$$

Figure 5:
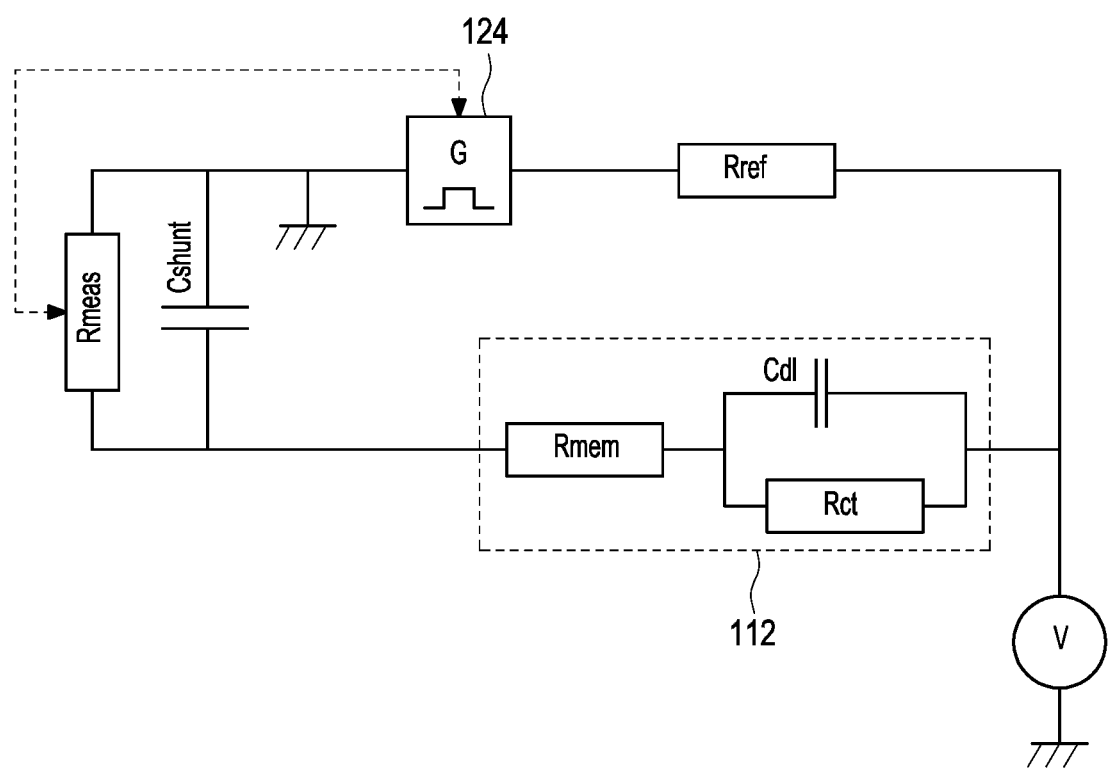
FIG. 5 shows a simplified circuit.

FIG. 5 shows a simplified circuit of the analytical system 110, in particular similar to FIG. 4A. The simplified circuit comprises a sensor, represented as a simple Randle's circuit, a reference resistor $R_{ref}$, a measurement resistor $R_{meas}$, a shunt capacitor $C_{shunt}$, the signal generator device 124. The Randle's circuit comprises the charge transfer resistance $R_{ct}$, which represents the diffusion limited analyte current, double layer capacitance $C_{di}$ at the electrode surface and the membrane element resistance $R_{mem}$.

The signal generator 124, in this embodiment a voltage source G, is configured for generating the at least one fast-transient voltage signal and applying it to a membrane comprising circuit 112 serially connected with a reference resistor $R_{ref}$, wherein the membrane element has a resistance $R_{mem}$. In particular, the signal generator device 124 may be configured for applying a measurement voltage signal, in particular a DC base voltage $V_{gen,base}$, and fast-transient voltage $V_{gen,pulse}$. During the $V_{gen,base}$ is applied, the current flows through all four resistors in the circuit. There is no current flow through the capacitors, as they are charged to the corresponding level. The $R_{ct}$ may be few orders of magnitude larger than $R_{mem}$, such that the voltage drop at the $R_{mem}$ can be neglected in the first approximation. The same is valid for the $R_{ref}$, which is chosen to be roughly the same value as the $R_{mem}$. The value for $R_{meas}$ may be chosen at the way, to get substantial voltage drop at it, which is then measured, e.g., by an additional voltmeter or electrometer which is not shown in the scheme, and converted in the sensor current signal, thus the value of the $R_{meas}$ is roughly of the same order of magnitude as the $R_{ct}$. Since the voltage drop at the $R_{meas}$ is substantial, it is compensated by the voltage source, which is in the feedback with the current measuring unit based on the $R_{meas}$.

The voltmeter V may be configured for determining the voltage $V_{gen,base}$ at the reference resistor before applying the fast-transient voltage signal to the membrane comprising circuit 112. The quantity $V_{gen,base}$ may be identical to $V_{ex,beforePulse}$ which was used above. In the ideal case, before the application of the fast-transient voltage signal, the voltage $V_{gen,base}$ may correspond to a voltage at the reference resistor in response to the measurement voltage signal. At this time point the voltmeter V may further measure at the working electrode 116 the measurement voltage signal $V_{meas,base}$. This quantity may be identical to the quantity $V_{prop,beforePulse}$ which was used above.

The response signal, i.e., propagated fast-transient voltage signal may be recorded either at the reference resistor $R_{ref}$ or at the membrane element comprising circuit $R_{mem}$ using the voltmeter V. During application of the fast-transient voltage signal the voltmeter V may measure at the reference resistor the voltage $V_{gen,pulse}$. This quantity may be identical to the quantity $V_{ex,duringPulse}$ which was used above. At this time point the voltmeter V may be configured for measuring the measurement voltage signal $V_{meas,pulse}$. This quantity may be identical to the quantity $V_{prop,duringPulse}$ which was used above. After the application of the fast-transient voltage signal, the voltage $V_{gen,pulse}$ may correspond to the voltage at the reference resistor in response to the measurement voltage signal and due to propagation of the fast-transient voltage signal.

In order to measure the $R_{mem}$, the signal generator device 124 may generate $V_{gen,pulse}$, here exemplarily higher than the DC base voltage. If the $V_{gen,pulse}$ is applied, the $C_{dl}$ and the $C_{shunt}$ start to charge causing an art of shortcut at the $R_{ct}$ and the $R_{meas}$ respectively. Thus, the whole $V_{gen,pulse}$ is distributed over the $R_{ref}$ and the $R_{mem}$. Since the $R_{ref}$ and the $R_{mem}$ comprise, in the first approximation, a simple voltage divider, the $R_{mem}$ can be easily calculated, once $V_{meas,pulse}$ is measured either at the $R_{ref}$ or at the $R_{mem}$ by means of the voltmeter. Here, exemplarily, at the $R_{mem}$ by means of voltmeter V.

In course of the $C_{dl}$ and $C_{shunt}$ charging, $V_{gen,pulse}$ starts to additionally drop at, correspondingly, $R_{ct}$ and $R_{meas}$, which is not desired. Furthermore, the additional voltage at the $R_{ct}$ means additional undesired current flow through the sensor caused, for instance, by unspecific oxidation of further substances, which must be avoided. Thus, the duration of $V_{gen,pulse}$ may be kept sufficiently short, in order to exclude the excessive $C_{dl}$ and $C_{shunt}$ charging and thus excessive voltage rise at $R_{ct}$ and $R_{meas}$. Correspondingly, the data acquisition rate of the voltmeter V may be sufficiently high, in order to record the $V_{meas,pulse}$ possibly immediately after applying $V_{gen,pulse}$.

The membrane resistance $R_{mem}$ may be calculated according to $$R_{mem} = R_{ref} \frac{V_{meas,pulse} - V_{meas,base}}{(V_{gen,pulse} - V_{gen,base}) - (V_{meas,pulse} - V_{meas,base})}.$$

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS 110 analytical system
112 analyte sensor
114 measurement electrode
116 working electrode
118 counter electrode
120 reference electrode
122 membrane element (membrane)
124 signal generator device
126 measurement unit
128 sensor contacts
130 Potentiostat
132 evaluation device
134 Current curve
136 equivalent series resistance curve
138 Temperature curve
140 equivalent series resistance curve
142 Current curve
144 Voltage curve

What is claimed is:

1. A method for determining a membrane property of an analyte sensor that has at least two measurement electrodes and at least one of the measurement electrodes has a membrane having the membrane property, the method comprising:
   a) generating a fast-transient voltage signal and applying the fast-transient voltage signal to the measurement electrodes;
   b) measuring a voltage response signal; and
   c) determining the membrane property by evaluating the voltage response signal.

2. The method according to claim 1, wherein applying the fast-transient voltage signal to the measurement electrodes comprises applying a fast transient voltage (Ugen, pulse) to a circuit comprising the membrane which is serially connected with a reference resistor;
   wherein measuring the voltage response signal comprises recording a voltage (Umeas, pulse) at either the reference resistor or the circuit comprising the membrane; and
   wherein the evaluating of the voltage response signal comprises determining the membrane property as a function of the fast transient voltage (Ugen,pulse), the recorded voltage (Umeas,pulse), and a resistance of the reference resistor.

3. The method according to claim 1, wherein the analyte sensor is an in vivo sensor.

4. The method according to claim 1, wherein the method is performed during in vivo measurement.

5. The method according to claim 1, wherein the method is performed during manufacturing of the analyte sensor.

6. The method according to claim 1, wherein the method comprises at least one failsafe step that is triggered depending on the determined membrane property.

7. The method according to claim 1, wherein the membrane property is permeability of the membrane.

8. The method according to claim 1, wherein the fast-transient voltage signal has a square wave form or a sine wave signal form.

9. The method according to claim 1, wherein the fast-transient voltage signal comprises a non-continuous signal with a pulse duration selected from the group consisting of ≤20 μs and ≤10 μs.

10. A method for determining concentration of an analyte in body fluid, comprising:
performing the method according to claim 1; and
completing an analyte measurement step during which a value of the concentration of the analyte is determined.

11. A non-transitory computer readable medium having stored thereon computer executable instructions for performing the method according to claim 1.

12. An analytical system for determining concentration of an analyte in body fluid, comprising:
an analyte sensor having at least two measurement electrodes and at least one of the measurement electrodes having a membrane having a membrane property;
a signal generator configured for generating a fast-transient voltage signal and applying the fast-transient voltage signal to the two measurement electrodes;
a measurement unit configured for receiving a voltage response signal; and
an evaluation device configured for determining the membrane property by evaluating of the voltage response signal.

13. The analytical system according to claim 12, wherein the analyte sensor is a two electrode sensor or a three electrode sensor.

14. The analytical system according to claim 12, wherein the measurement electrodes are arranged on opposing sides of the analyte sensor.

15. The analytical system according to claim 12, wherein the analytical system is configured for performing the method according to 1.

16. The analytical system according to claim 12, wherein the analytical system is configured for performing the method according to 10.

17. The analytical system according to claim 12, wherein:
the signal generator applies a fast transient voltage ($U_{gen,pulse}$) to a circuit comprising the membrane which is serially connected with a reference resistor;
the measurement unit is configured to measure a voltage ($U_{meas,pulse}$) at either the reference resistor or the circuit comprising the membrane; and
the evaluation device is configured to determine the membrane property as a function of the fast transient voltage ($U_{gen,pulse}$), the measured voltage ($U_{meas,pulse}$), and a resistance of the reference resistor.

* * * * *